United States Patent
Shishido et al.

(10) Patent No.: US 6,865,288 B1
(45) Date of Patent: Mar. 8, 2005

(54) PATTERN INSPECTION METHOD AND APPARATUS

(75) Inventors: Chie Shishido, Yokohama (JP); Masahiro Watanabe, Yokohama (JP); Yuji Takagi, Kamakura (JP); Hiroshi Miyai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 823 days.

(21) Appl. No.: 09/612,501

(22) Filed: Jul. 7, 2000

(30) Foreign Application Priority Data

Jul. 7, 1999 (JP) .......................................... 11-193676

(51) Int. Cl.[7] .............................................. G06K 9/00
(52) U.S. Cl. ...................... 382/145; 382/141; 382/144
(58) Field of Search ................................. 382/145–152, 382/181, 141, 190, 199, 219; 250/559.39, 559.45

(56) References Cited

U.S. PATENT DOCUMENTS 5,157,735 A * 10/1992 Maeda et al. ................ 382/141
5,649,022 A * 7/1997 Maeda et al. ................ 382/141
5,774,222 A * 6/1998 Maeda et al. ................ 356/394

FOREIGN PATENT DOCUMENTS

JP          A-5-6928      * 1/1993    ........... H01L/21/66
JP          A-10-74812    * 3/1998    ........... H01L/21/66

* cited by examiner

Primary Examiner—Leo Boudreau
Assistant Examiner—Duy M. Dang
(74) Attorney, Agent, or Firm—Antonelli, Terry, Stout & Kraus, LLP

(57) ABSTRACT

A pattern inspection method and apparatus are disclosed, the method has the steps of generating a reference digital image signal to be compared with a detection digital image signal detected continuously from the desired band-shaped inspection area on an object to be inspected, determining zero or one or more candidate , matching positions between the detection digital image signal and the reference digital image signal for each block unit area sequentially cut out and calculating a mass of candidate matching positions over the entire band-shaped inspection area, determining an accurate matching position between the detection digital image signal and the reference digital image signal for each block unit area based on the continuity of the block unit areas from the calculated mass of candidate matching positions over the entire band-shaped inspection area, and determining a defect by matching the positions based on the determined accurate matching position for each block unit area and comparing the images.

23 Claims, 19 Drawing Sheets

| y \ x | −4 | −3 | −2 | −1 | 0 | 1 | 2 | 3 | 4 |
|---|---|---|---|---|---|---|---|---|---|
| −4 | −0.47 | −0.24 | 0.248 | 0.603 | 0.523 | 0.085 | −0.34 | −0.44 | −0.15 |
| −3 | 0.4 | 0.177 | −0.13 | −0.27 | −0.16 | 0.137 | 0.407 | 0.412 | 0.131 |
| −2 | 0.722 | 0.402 | −0.17 | −0.53 | −0.43 | 0.064 | 0.579 | 0.692 | 0.304 |
| −1 | −0.07 | 0.046 | 0.202 | 0.281 | 0.186 | −0.01 | −0.12 | −0.09 | 0.067 |
| 0 | −0.58 | −0.26 | 0.341 | 0.75 | 0.618 | 0.059 | −0.46 | −0.55 | −0.16 |
| 1 | 0.077 | 0.017 | 0.006 | 0.06 | 0.113 | 0.142 | 0.149 | 0.103 | 0.02 |
| 2 | 0.763 | 0.4 | −0.21 | −0.57 | −0.44 | 0.107 | 0.651 | 0.743 | 0.296 |
| 3 | 0.277 | 0.218 | 0.068 | −0.05 | −0.08 | 0.012 | 0.166 | 0.246 | 0.185 |
| 4 | −0.52 | −0.2 | 0.359 | 0.725 | 0.573 | 0.03 | −0.45 | −0.51 | −0.11 |

| y \ x | -4 | -3 | -2 | -1 | 0 | 1 | 2 | 3 | 4 |
|---|---|---|---|---|---|---|---|---|---|
| -4 | 0.88 | 0.909 | 0.938 | 0.961 | 0.97 | 0.961 | 0.94 | 0.916 | 0.893 |
| -3 | 0.879 | 0.909 | 0.937 | 0.96 | 0.969 | 0.96 | 0.939 | 0.916 | 0.893 |
| -2 | 0.879 | 0.908 | 0.937 | 0.96 | 0.968 | 0.96 | 0.939 | 0.915 | 0.892 |
| -1 | 0.879 | 0.908 | 0.936 | 0.959 | 0.968 | 0.959 | 0.939 | 0.915 | 0.892 |
| 0 | 0.878 | 0.908 | 0.937 | 0.96 | 0.968 | 0.959 | 0.939 | 0.915 | 0.892 |
| 1 | 0.878 | 0.908 | 0.937 | 0.959 | 0.968 | 0.96 | 0.939 | 0.915 | 0.893 |
| 2 | 0.878 | 0.908 | 0.936 | 0.959 | 0.968 | 0.96 | 0.939 | 0.915 | 0.893 |
| 3 | 0.878 | 0.907 | 0.936 | 0.959 | 0.968 | 0.96 | 0.939 | 0.915 | 0.892 |
| 4 | 0.878 | 0.907 | 0.936 | 0.959 | 0.968 | 0.959 | 0.938 | 0.915 | 0.892 |

$$\delta x = \frac{E - W}{2(2C - E - W)}$$

$$\delta x = \frac{S - N}{2(2C - S - N)}$$

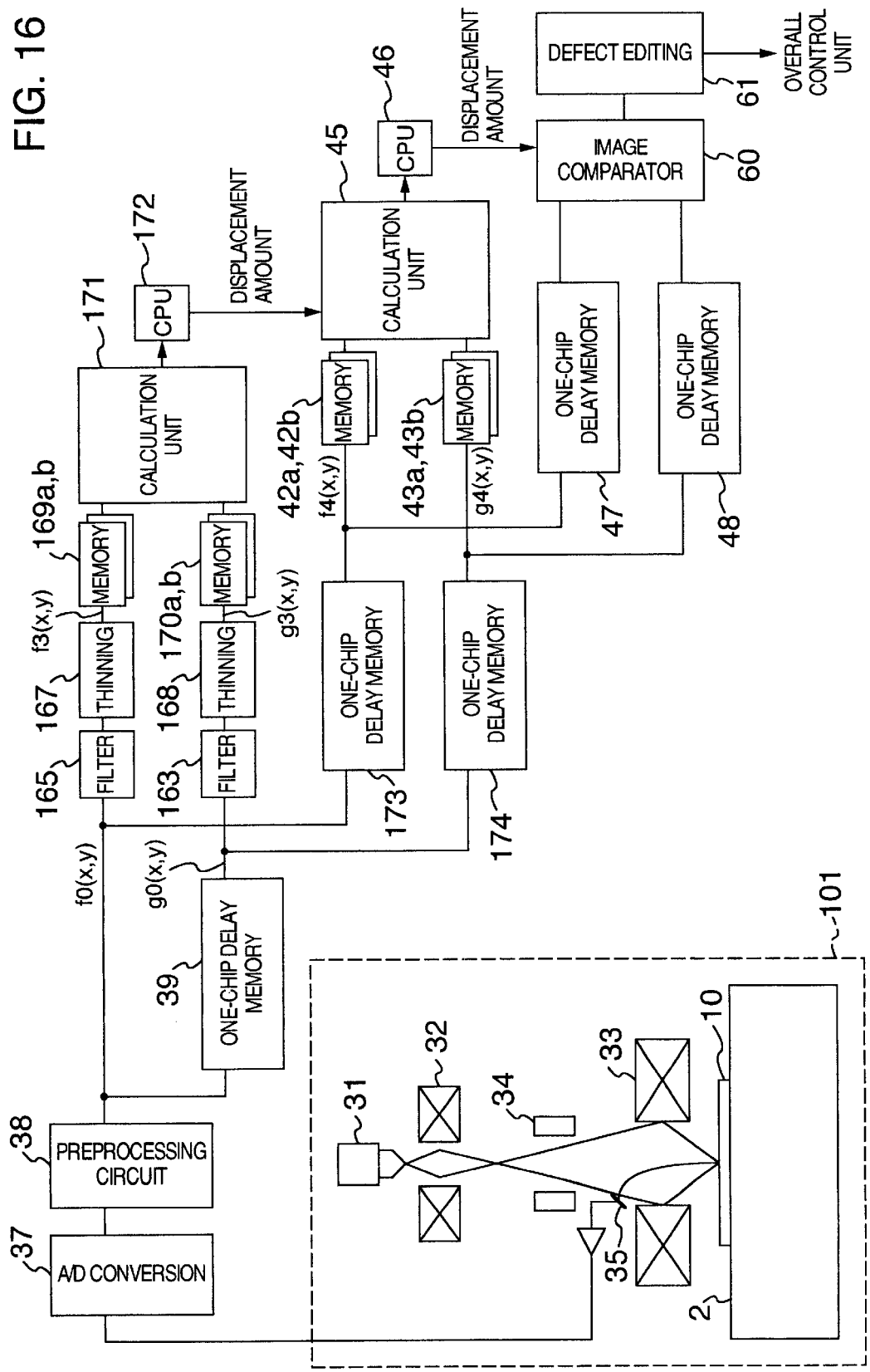

THINNING FOR EVERY TWO PIXELS

THINNING FOR EVERY FOUR PIXELS

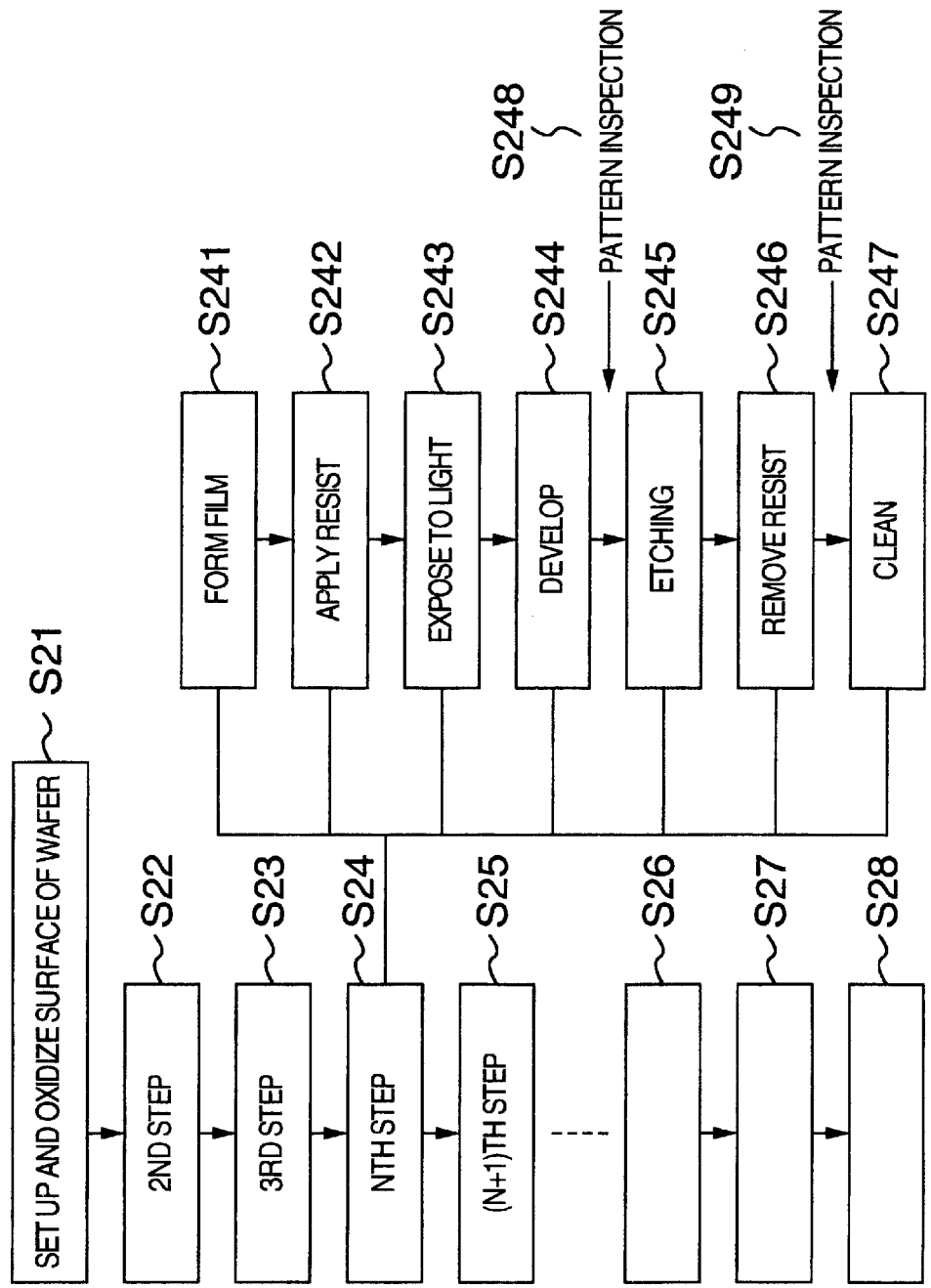

ical image signals, and the object pattern is inspected
PATTERN INSPECTION METHOD AND APPARATUS

BACKGROUND OF THE INVENTION

The present invention relates to a pattern inspection method and apparatus for producing an image of an object such as a semiconductor wafer, a TFT or a photomask using an electron beam or light and comparing the image-with a reference image stored in advance thereby to detect a defect, or in particular to a pattern inspection method and apparatus suitable for inspecting a semiconductor logic product using the electron beam.

The prior art disclosed in JP-A-5-6928 (prior art 1) and JP-A-10-74812 (prior art 2) for pattern inspection to detect a defect by comparing continuously input canditate (object) images with a reference image are well known.

The prior art 1 concerns a pattern inspection method and apparatus in which the shift amount (displacement amount) between a detection binarized edge signal indicating a detection edge pattern from a detection image signal detected by a linear image sensor and a reference binarized edge signal indicating a reference edge pattern from the reference image signal obtained by delaying the repeated chip pitch is detected by a non-coincidence detection circuit for each area scanned two-dimensionally by the linear image sensor and stored in a status storage unit. In the case where the present detection result stored in the status storage unit is different from the result of detection by the non-coincidence detection circuit in the preceding inspection, a positioning circuit is controlled in accordance with the preceding shift amount or a predetermined shift amount as well as the present shift amount, so that a common non-coincident pixel indicated by the comparison of the binarized edge signal with each shift amount in a defect determining circuit is determined as a defect. The prior art 1 also includes the description that a detection error for determining the normal portion as a defect due to the positioning condition is reduced. In other words, according to the prior art 1, the range in which a displacement occurs is enlarged and only a common non-coincident pixel, if any, is determined as a defect.

The prior art 2, on the other hand, concerns a method in which an image signal of a repetitive object pattern is continuously detected and the object pattern is inspected based on the image signal thus continuously detected. The prior art 2 thus includes the description that the image continuity is determined using the displacement amount information of the past images as well the current image in the process of positioning a plurality of images, and the inspection sensitivity of the boundary portion of discontinuous images is controlled based on the image continuity.

Both the prior art 1 and the prior art 2, however, lack the consideration of any means to reduce the chance of erroneously detecting a normal fine pattern coexisting with various fine patterns within a die (chip) of an object and to prevent the overlooking fine detects included in the fine patterns.

SUMMARY OF THE INVENTION

Accordingly, an object of the present invention is to obviate the aforementioned problem and to provide a pattern inspection method and apparatus using image comparison, in which the chance of detection error of a normal fine pattern is reduced by reducing the high-precision positioning failure in subpixels of an object having various fine patterns existing therein, while at the same time making accurate inspection possible without overlooking the fine detects occurred in the fine patterns.

Another object of the invention is to provide a pattern inspection method and apparatus using image comparison, in which the high-precision positioning failure in subpixels is reduced by performing the positioning operation in a plurality of stages (including stages in an wide area in terms of the number of pixels and a narrow area in terms of the number of pixels) based on the electron beam image signal detected continuously from an object having various patterns coexisting therein, so that the false alarm rate (the chance of detection error of a normal fine pattern) is reduced while at the same time making accurate inspection possible without overlooking fine detects occurring in a fine pattern.

Still another object of the invention is to provide a pattern inspection method and apparatus using image comparison, which is applicable to a wide range of objects by eliminating the restraints on the shape of fine patterns.

In order to achieve the aforementioned objects, according to one aspect of the invention, there is provided a pattern inspection method comprising the steps of:

converting the analog detection image signals input by being continuously detected from the desired band-shaped inspection area on an object into detection digital image signals;

generating a reference digital image signal to be compared with the converted detection digital image signal;

cutting out, based on the reference digital image signal and the detection digital image signal thus generated, each of the detection digital image signal and the reference digital image signal sequentially for each of a plurality of block unit areas into which the band-shaped inspection area is segmented;

determining candidate matching positions between the reference digital image signal and the detection digital image signal for each block unit area sequentially cut out and calculating a mass of candidate matching positions over the band-shaped inspection area;

determining, from the mass of the candidate matching positions over the calculated band-shaped inspection area, an accurate matching position between the reference digital image signal and the detection digital image signal for each block unit area based on the continuity between the block unit areas; and determining a defect based on the image comparison by position matching between the detection digital image signals and the reference digital image signal at least for each block unit area based on the accurate matching position determined for each block unit area.

In order to achieve the aforementioned objects, according to another aspect of the invention, there is provided a pattern inspection method for inspecting a fine pattern included in each of a multiplicity of chips formed on a substrate, comprising the steps of:

picking up an image of the substrate while being continuously moved;

producing a reference image signal from the detection image signal obtained by picking up an image of the substrate;

determining, for each of segmentation areas each smaller than one of a multiplicity of chips formed on the substrate, the displacement amount between the images corresponding to the reference image signal and the detection image signal of the substrate picked up while moving the substrate continuously;

correcting the detection image signal and the reference image signal based on the displacement amount for each of the segmentation areas each smaller than one chip; and detecting a defect of the pattern formed on the object by comparing the corrected image signal and the corrected reference image signal with each other.

In order to achieve the aforementioned objects, according to still another aspect of the invention, there is provided a pattern inspection method for inspecting a fine pattern included in each of a multiplicity of chips formed on a substrate, comprising the steps of:

producing an image signal of the substrate by picking up an image of the substrate;

producing a reference signal from the image signal thus obtained;

determining, for each of the segmentation areas each smaller than one of a multiplicity of chips formed on the substrate, the amount of correcting the displacement between the images corresponding to the image signal of the substrate and the reference image signal;

correcting the displacement (shift) between the detection image signal and the reference image signal based on the displacement correction amount obtained above;

comparing the corrected detection image signal and the corrected reference image signal with each other and extracting candidate defects of the pattern formed on the object; and editing the candidate defects thus extracted.

In order to achieve the aforementioned objects, according to a further aspect of the invention, there is provided a pattern inspection apparatus comprising:

image signal acquisition means for acquiring image signals continuously from the desired band-shaped inspection area on an object to be inspected;

image signal conversion means for converting an analog image signal acquired by the image signal acquisition means into a detection digital image signal by A/D conversion means;

reference image generating means for generating a reference digital image signal to be compared with the detection digital image signal produced from the image signal conversion means;

image signal cut-out means for sequentially cutting out the detection digital image signal and the reference digital image signal for each of a plurality of block unit areas into which the band-shaped inspection area is segmented, based on the reference digital image signal generated by the reference image generating means and the detection digital image signal;

candidate matching position calculation means for determining candidate matching positions between the reference image signal and the detection image signal for each block unit area cut out sequentially in the image signal cut-out process by the image signal cut-out means and calculating a mass of the candidate matching positions over the whole band-shaped inspection area;

matching position determining means for determining an accurate matching position between the detection image signal-and the reference image signal for each block unit area based on the continuity between the block unit areas from the calculated mass of the candidate matching positions over the band-shaped inspection area; and defect determining means for determining, based on the accurate matching position for each block unit area determined by the matching position determining means, a defect by image comparison for position matching between the detection digital image signal and the reference digital image signal at least for each block unit area.

Further, in order to achieve the aforementioned objects of the invention, according to a still further aspect of the invention, there is provided a pattern inspection apparatus for inspecting a fine pattern included in each of a multiplicity of chips formed on a substrate, comprising:

table means for placing the substrate thereon and moving the substrate continuously;

image pickup means for picking up an image of the substrate continuously moved by the table means;

reference image producing means for producing a reference image signal from the image signal obtained by picking up an image of the substrate with the image pickup means;

displacement detection means for determining, for each of the segmentation areas each smaller than each of a multiplicity of chips formed on the substrate, the displacement amount between the images corresponding to the image signal of the continuously moved substrate obtained by the image pickup means and the reference image signal produced by the reference image producing means;

displacement correcting means for correcting the image signal and the reference image signal based on the displacement amount determined by the displacement detection means for each of the areas smaller than one chip; and defect detection means for comparing the image signal and the reference image signal corrected by the correcting means with each other and detecting a defect of the pattern formed on the object.

Furthermore, in order to achieve the objects described above, according to a yet further aspect of the invention, there is provided a pattern inspection apparatus for inspecting a fine pattern included in each of a multiplicity of chips formed on a substrate, comprising:

image acquisition means for picking up an image of the substrate and acquiring an image signal of the substrate;

reference image producing means for producing a reference signal from the image signal acquired by the image acquisition means;

correction amount detection means for determining the amount of correction of the displacement between the image signal of the substrate acquired by the image acquisition means and the reference signal produced by the reference signal producing means for each area smaller than one of a multiplicity of chips formed on the substrate;

displacement correction means for correcting the displacement between the detection image signal and the reference image signal for each area smaller than one chip based on the displacement correction amount determined by the displacement correction amount detection means;

candidate defect extraction means for extracting a candidate defect of the pattern formed on the object by comparing the detection image signal and the reference image signal corrected by the displacement correction means with each other; and candidate defect editing means for editing the candidate defect extracted by the candidate defect extraction means.

As described above, according to this configuration, even in the case where a high-definition detection digital image signal is arbitrarily detected for each of the block unit areas in various forms as shown in FIGS. 2 and 3 from the inspection area on the object, an accurate displacement amount can always be determined by estimation for each block unit area utilizing the fact that the high-definition input detection digital image signal has a continuity over the band-shaped inspection area. Thus, the block unit areas generating false information by a positioning error are eliminated. In addition, a defect is determined based on a high-definition image signal positioned to less than a very fine pixel for each block unit area, and therefore, the inspection area having various fine patterns can be inspected without overlooking a fine defect.

Especially, even in the case where the S/N ratio of the high-definition detection image signal is low or the contrast of the fine pattern is low or the brightness has an irregularity or the image is deformed by the vibrations of a running stage, the displacement amount can be always determined accurately by estimation for each block unit area. Therefore, the block unit areas generating false information due to a positioning error are eliminated, and the inspection can be carried out without overlooking a fine defect from the inspection area having various fine patterns.

These and other objects, features and advantages of the invention will be apparent from the following more particular description of preferred embodiments of the invention, as illustrated in the accompanying drawings.

BRIEF DESCRIPTION OF THE DRAWINGS

FIG. 16 is a diagram showing a general configuration of a pattern inspection apparatus using an electron beam according to the fourth embodiment of the invention.

FIG. 20 is a diagram for explaining an application of the pattern inspection apparatus according to an embodiment of the invention to the process of manufacturing semiconductors.

DESCRIPTION OF THE EMBODIMENTS

A pattern inspection method and an apparatus for the method according to the present invention will be explained with reference to the drawings.

Embodiment 1

Figure 1:
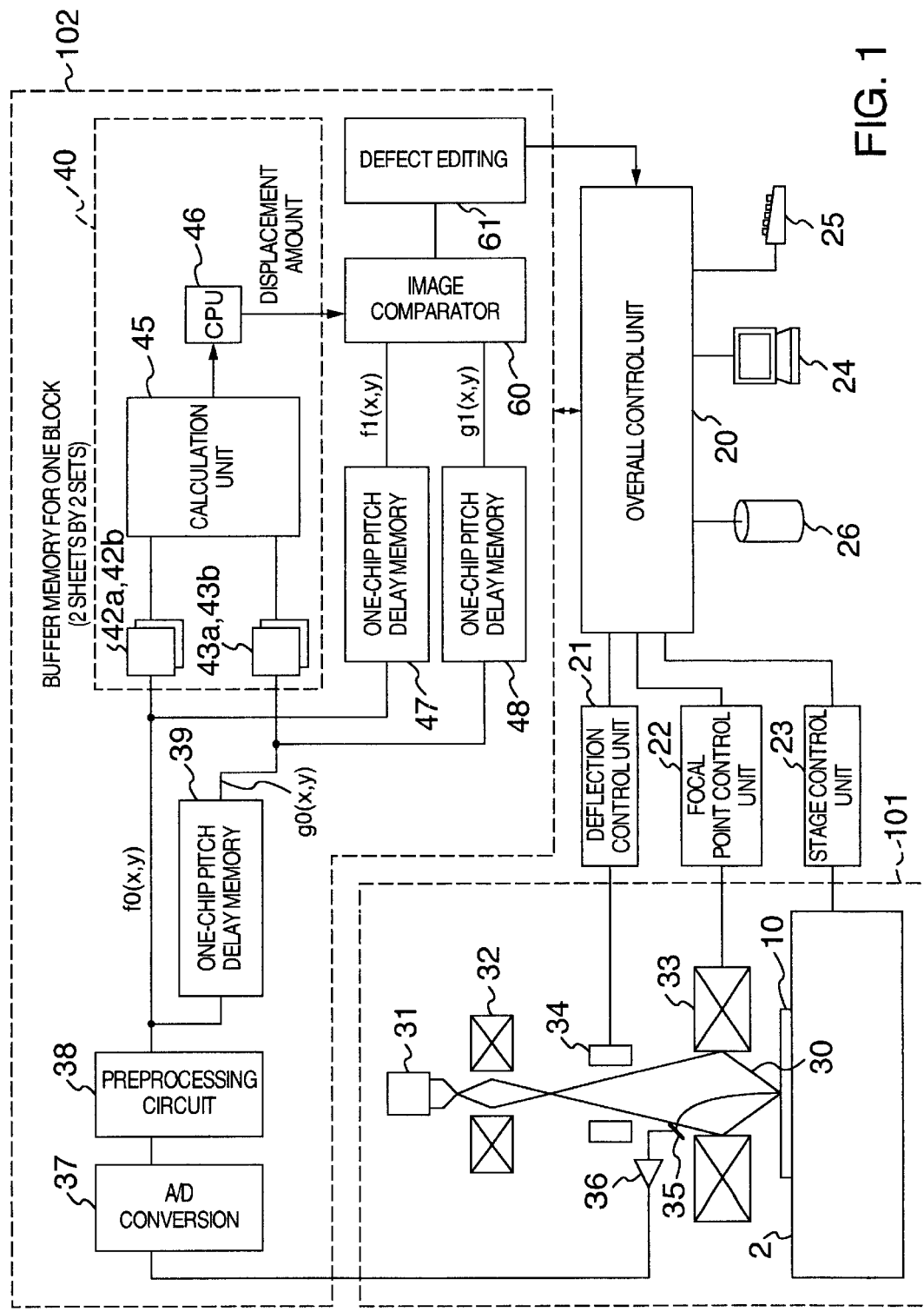
FIG. 1 is a diagram showing a general configuration of a pattern inspection apparatus using an electron beam according to a first embodiment of the invention.

FIG. 1 is a block diagram showing a configuration of a pattern inspection apparatus according to a first embodiment of the invention. Specifically, the pattern inspection is conducted in such a manner that en electron beam 30 is scanned and radiated on an object (a substrate to be inspected) 10 such as a semiconductor wafer, and the electrons generated from the object 10 are detected by an electron detector 35. According to the change of strength of the electron beam, an electron beam image of the scanned part is obtained and used for the inspection.

Figure 4:
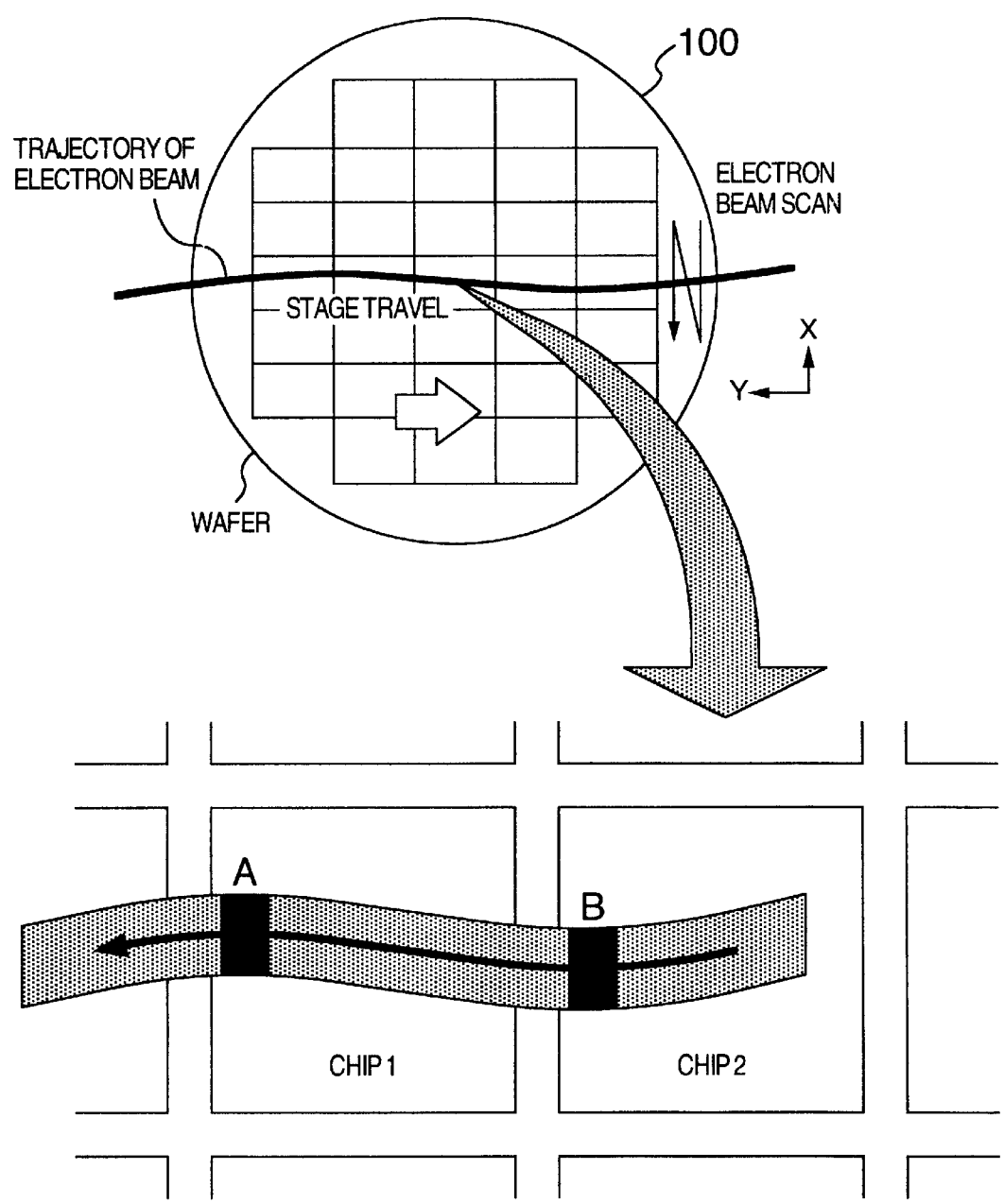
FIG. 4 is a diagram for explaining the chip comparison executed in the image comparator unit shown in FIG. 1.

The object 10 such as a semiconductor wafer includes, as shown in FIG. 4, an arrangement of a multiplicity of chips which are to become the same final products. In the pattern inspection apparatus shown in FIG. 1, an image A of a given die (chip) (a chip 1 in FIG. 4, for example) detected by the electron beam is compared with an image B of another adjacent chip (a chip 2 in FIG. 4, for example) detected by the electron beam thereby to recognize a defect.

The pattern inspection apparatus according to a first embodiment comprises a detection unit 101, an image processing unit 102 and a general control unit (not shown) for controlling the whole system. The general control unit is configured with one or a plurality of computers for controlling the timing of various operations and coordinates for the detection unit 101 and the image processing unit 102 on the one hand and controls a series of inspection operations from the set-up of the object 10 such as a semiconductor wafer to the output of the inspection result in accordance with a sequence programmed in advance.

Now, the detection unit 101 will be described. Specifically, the detection unit 101 includes an electron gun 31 for emitting an electron beam, a condenser lens 32 for converging the electron beam emitted from the electron gun 31, a blanking electrode unit (not shown) for turning on/off the radiation of the electron beam, an objective lens 33 for reducing the electron beam converged in the condenser lens 32, further to a beam diameter of not more than about the pixel size (0.3 to 0.05 μm) and radiating the electron beam in a focal state on the sample surface, a scan deflector 34 for scanning by deflecting the electron beam, a stage 2 movably controlled in X-Y direction with the object 10 such as a semiconductor wafer placed thereon, and an electron detector 35 for detecting such electrons as the secondary electrons and the reflected electrons emitted from the object 10.

A deflection control unit 21 is for controlling the scan deflector 34 based on a control command from the overall control unit 20. A focal point control unit 22 is for controlling the objective lens 33 into the focal state based on the height information of the object 10 detected by an optical height detector (not shown) for example. A stage control unit 23 is for controlling the drive of the stage 2 based on the stage control information from the overall control unit 20 in response to the stage displacement information fed back from a length measuring unit for measuring the length of the stage displacement.

The overall control unit 20 is connected with a display means 24 for displaying the defect information obtained from the defect editing unit 61, the data on the matching position (displacement amount) determined for a block unit area by the displacement detection unit 40, a threshold value $th(x,y)$ indicating the standard (inspection sensitivity) of the defect determination calculated in a threshold value calculation unit 115 in an image comparator 60 and the CAD information for the chip arrangement or the like on the substrate to be inspected; an input means 25 for setting the inspection area and the area intended for displacement detection by referring to the CAD information for the chip arrangement or the like on the substrate displayed on the display means 24; and a storage unit 26 or storing various control data, control programs and the defect information obtained from the defect editing unit 61. The display means 24 may be configured to display an electron beam digital image of the whole substrate to be inspected, actually obtained from a preprocessing circuit 38.

Thus, the electron beam emitted from the electron gun 31 is converged into the focal state with a beam diameter of not more than about the pixel size (0.3 to 0.05 μm) on the sample surface through the condenser lens 32 and the objective lens 33. Once the converged electron beam is radiated in this way, the secondary electrons or the reflected electrons are generated from the object substrate 10 such as a semiconductor wafer. The repetitive scan of the converged electron beam in X direction by the scan deflector 34 under the control of the deflection control unit 21 is combined with the continuous moving-scan of the object substrate 10 in Y direction by the stage 2 under the control of the stage control unit 23, so that the converged electron beam is two-dimensionally scanned and radiated on the object substrate 10, and the electrons generated in synchronism from the object substrate 10 are detected by the electron detector 35 thereby to produce a two-dimensional electron beam image of the object substrate 10. The two-dimensional electron beam image acquired by the electron detector 35 in this way is amplified by an amplifier 36 and input to the image processing unit 102.

The image processing unit 102 includes an A/D converter 37 for converting the two-dimensional analog detection image signal input thereto into a two-dimensional digital detection image signal, a preprocessing circuit 38 for performing the image corrections such as the dark level correction, the correction of the electron source fluctuation and the shading correction on the two-dimensional digital detection image signal obtained from the A/D converter 37, a delay memory 39 for producing a reference image signal (reference image data) $g0(x,y)$ by delaying, by the number of repetitive chips, the detection image signal (detection image data) $f0(x,y)$ subjected to the image correction in the preprocessing circuit 38, a displacement detection unit 40 for detecting the displacement amount between the detection image signal $f0(x,y)$ and the reference image signal $g0(x,y)$, delay memories 47, 48 for delaying each of the detection image signal $f0(x,y)$ and the reference image signal $g0(x,y)$, an image comparator unit 60 for matching the position of the image signals $f1(x,y)$, $g1(x,y)$ delayed one chip, using the displacement amount determined in the displacement detection unit 40 and comparing the two image signals thereby to determine the non-coincidence exceeding a predetermined reference as a candidate defect, and a defect editing unit 61 for merging the neighboring non-coincident portions into sets based on the image signals of the candidate defects obtained from the image comparator unit 60 and calculating the feature quantities such as the weight coordinate, the X-Y projection length and the area of the candidate defects for each set thereby to delete the false information from the feature quantities of the candidate defects thus calculated.

In this way, the two-dimensional analog image signal detected by the electron detector 35 is converted into a two-dimensional digital image signal (digital image data indicating the gradation corresponding to the variable density value of each pixel) by the A/D converter 37 and then input to the preprocessing circuit 38. In the preprocessing circuit 38, the two-dimensional digital image signal is subjected to such image corrections as the dark level correction, the electron source fluctuation correction and the shading correction.

Then, the detection image signal produced from the preprocessing circuit 38 is delayed, in the delay memory 39 configured with a shift register or the like, by the time required for the stage 2 to move the distance corresponding to the chip interval (d1 in FIG. 4) thereby to produce a reference image signal to be compared with the detection image signal. Ideally, the delayed reference image signal $g0(x,y)$ and the detection image signal $f0(x,y)$ not delayed should constitute an image signal at the same point on adjacent chips. Actually, however, this is not the case by reason of the fact that the deflection position of the electron beam develops irregularities due to the vibrations of the stage, the drift or charging of the electro-optic system and the charging of the semiconductor wafer. In view of this, the displacement detection unit 40 is required to determine the displacement between the two image signals (the detection image signal $f0(x,y)$ and the reference image signal $g0(x,y)$), based on which the images are compared with each other in the image comparator unit 60.

The displacement detection unit 40 according to this invention includes buffer memories 42a, 42b, 43a, 43b, a calculation unit 45 for calculating the correlation value (normalized cross-correlation value) matrix or the square sum of the remainders or the total sum of the absolute values of the remainders, and a CPU 46. The detection image signal $f0(x,y)$ and the reference image signal $g0(x,y)$ are continuously input to the displacement detection unit 40, and stored in memories 42a, 43a thereby to produce image data of a predetermined size. The memories 42b, 43b are for writing the image data continuously input from the detection unit 101 while the data are being read by the calculation unit 45 from the memories 42a, 43a. The memories 42a, 43a and the memories 42b, 43b are used by being switched for write and read operations alternately.

The calculation unit 45 alternately reads from the memories 42a, 42b the image data of a predetermined size (configured with a pixel matrix of $M_X \times M_Y$) obtained by segmentation from the detection image data as a segmentation processing unit, and also alternately reads from the memories 43a, 43b the image data of a predetermined size (configured with a pixel matrix of $N_X \times N_Y$) obtained as a segmentation from the reference image data as a segmentation processing unit. The normalized cross-correlation calculation unit 45 calculates, as segmentation processing units of the image data of a predetermined size read out, the correlation values (normalized cross-correlation values) with the detection image data (configured with the pixel matrix of $M_X \times M_Y$) and the reference image data (configured with the pixel matrix of $N_X \times N_Y$) shifted relatively by 0 to $\pm p_X$ pixels in X direction and by 0 to $\pm p_Y$ pixels in Y direction, i.e. P $(=( (P_X+1) \times (P_Y+1)))$ correlation values in parallel, where M is assumed to be N+2p.

The image data of the predetermined size obtained by segmentation as described above will hereinafter be called a block unit area (segmentation unit area). An embodiment of the invention in which a band-shaped inspection area is segmented into a multiplicity of block unit areas (segmentation unit areas) and has a large number of pixels is schematically shown in blocks 1, 2, 3, 4, 5 in FIG. 6. These block unit areas represent a band-shaped inspection area in a chip with an enlarged view of the image size ($M_X \times M_Y$) segmented along the direction of stage travel. In view of the fact that the matching position (displacement amount) is determined by block unit areas, adjacent block unit areas may be somewhat distant from each other or may be superposed partially on each other. Also, the block unit area can be segmented along the direction of electron beam scanning in the band-shaped inspection area in the chip. In such a case, the image size ($M_X \times M_Y$) of the block unit area is of course reduced.

In the case where the image size ($M_X \times M_Y$) of the block unit area is large, the number M of pixels is about 500 to 1000, while the number M of pixels is about 10 to 100 for a small image size ($M_X \times M_Y$) of the block unit area. Incidentally, by reducing the image size ($M_X \times M_Y$) of the block unit area as compared with the image distortion dynamically caused by the stage travel, the positioning failure which otherwise might be caused by the image distortion can be eliminated.

In the calculation unit 45 of the CPU 46, the candidate matching positions ($s_B(\Delta x, \Delta y)$) between the detection image and the reference image is calculated by the method described below based on the correlation value matrix including M elements in a block unit area (n,m) and stored in a built-in memory (not shown). The number of candidate matching positions is not predetermined but may be 0 or plural depending on the pattern included in the block unit area involved. In the CPU 46, the candidate matching position (dn($\Delta x, \Delta y$)) is determined for each block unit area, and upon collection of candidates for one chip, the matching positions for all the block unit areas of one chip are determined.

Figure 2A:
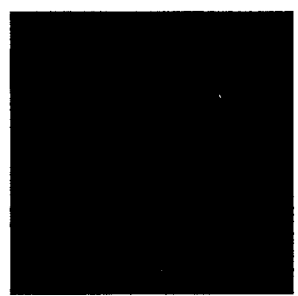
FIGS. 2A, 2B and 2C are diagrams showing an image signal detected in a block unit area for which a matching position is not determined according to the invention.
Figure 2B:
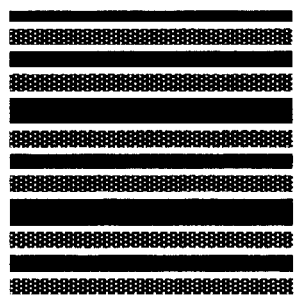
Figure 2C:
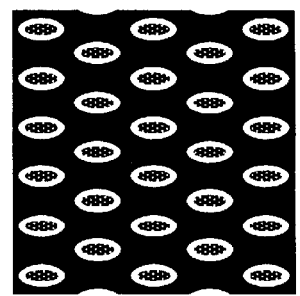
Figure 3A:
FIGS. 3A, 3B and 3C are diagrams showing an image signal detected in a block unit area, which constitutes false information unless the matching position thereof is correctly determined.
Figure 3B:
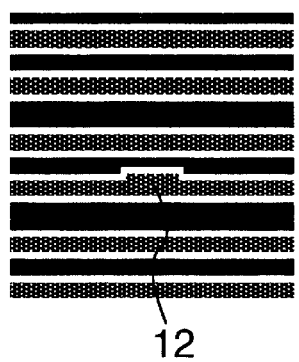
Figure 3C:
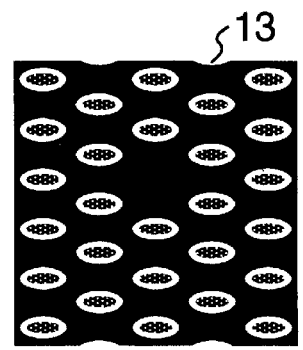
Figure 5:
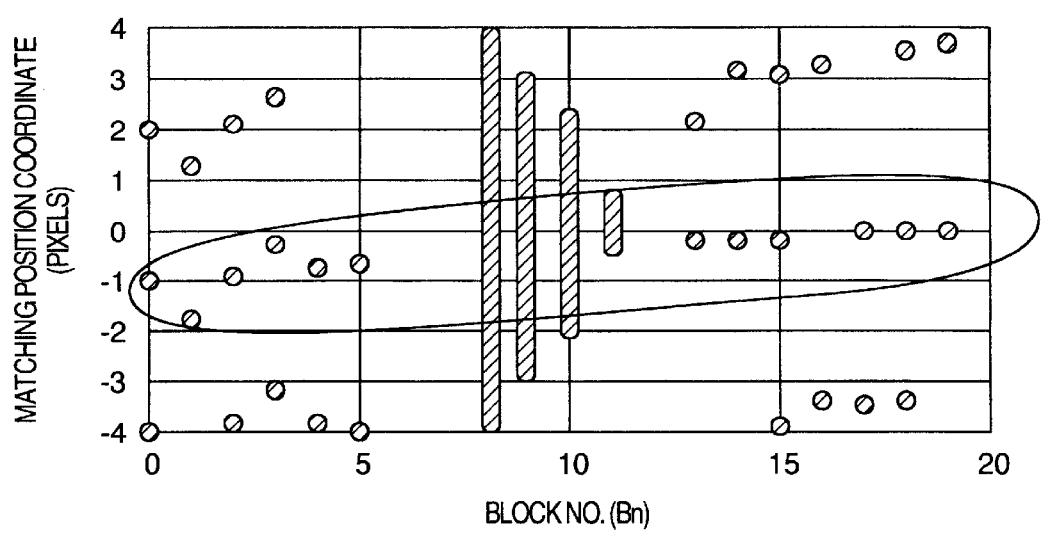
FIG. 5 is a diagram showing candidate matching positions obtained for the block numbers 0 to 20 for each block unit area in the band-shaped inspection area on the object according to the invention.

The concept of the method of determining the matching position by the calculation in the CPU 46 is shown in FIG. 5. FIG. 5 shows the coexistence in one chip of an area substantially free of the pattern as shown in FIGS. 2A and 3A, an area having a pattern directed substantially along one axis as shown in FIGS. 2B and 3B, and an area having a pattern repeated substantially along two axes as shown in FIGS. 2C and 3C. In FIG. 5, the abscissa represents a block unit area number (n), and the ordinate the candidate coordinate (in pixels) of the matching position (dn($\Delta x, \Delta y$)) along one axis (Y axis, for example).

In this case, $\Delta x$ can be expressed as pixel a, and $\Delta y$ as pixel b. For the block unit area number n=0 to 4, for example, a pattern repeated substantially along Y direction is formed, and therefore about two or three candidate matching positions are detected; for the block unit area number n=5, one candidate matching position is detected; for the block unit area number n=6 to 7 where substantially no pattern exists, no candidate matching position is detected (0); for the block unit area number n=8 to 11 where a non-repetitive pattern is formed along Y axis, matching positions continuous for a certain width are detected; for the block unit area n=12 where substantially not pattern exists, the matching position is not detected; and for the block unit area n=13 to 20 where a comparatively repetitive pattern is formed along Y direction, about two or three matching positions are detected. The matching positions are assumed to be detected in subpixels.

Even in the case where various fine patterns coexist in a chip, an accurate (correct) matching position is expected to undergo a constant change since the detection image data and the reference image data are continuously input. Specifically, the patterns of various shapes formed in the inspection area on the object (substrate to be inspected) 10 are continuously formed by exposure or plotting, and in addition, the stage carrying the object 10 is continuously run. Therefore, the error in the displacement between the detection image data and the reference image data also undergoes a continuous change.

Thus, in FIG. 5, the candidates defined by an ellipse (connected by a smooth curve over the band-shaped inspection area including a plurality of block unit areas) is estimated to be values along Y axis ($\Delta yr$) of the accurate matching position (drn($\Delta xr, \Delta yr$)). The accurate matching position for the block unit area having no candidate, on the other hand, can be determined by interpolation of the preceding and succeeding accurate matching positions.

Also, as shown in FIG. 5, the candidate matching positions are detected or not detected at random from a multiplicity of the block unit areas extending over the band-shaped inspection area. Therefore, the accurate matching position of the block unit area having no candidate is required to be determined by calculating a smooth curve which passes through a greater number of preceding and succeeding accurate matching positions or the neighborhood thereof over the entire band-shaped inspection area. Since the matching positions are actually two-dimensional, the smooth curve assumes a smooth curved surface.

In a specific algorithm for determining accurate matching positions (accurate displacement amounts) by the calculation in the CPU 46, the accurate position of a block having only one candidate (block No. 15 in FIG. 5) is selected as a reference position (origin) from among the candidate matching positions (dn($\Delta x, \Delta y$)) between the detection image and the reference image calculated based on the correlation value matrix including M elements calculated for the block unit area N by the calculation unit 45 and stored in a memory (not shown), and in the blocks preceding and succeeding to the reference position, a candidate matching position nearest to the reference position (origin) is selected. This process is sequentially propagated. Other numerous algorithms are conceivable. Which algorithm is to be selected depends on the limitation of the calculation time and the calculation performance of the CPU and therefore will not be described in detail.

The gist of the present invention is that in view of the fact that fine patterns of various shapes are formed in the inspection area (chip area) of the object substrate 10 and the accurate matching position may not be determined between the detection image and the reference image independently for each segmented block unit area, the accurate matching position (drn($\Delta$xr,$\Delta$yr)) at least in the block unit area is determined utilizing the mass of the candidate matching positions calculated by the CPU 46 over the entire band-shaped inspection area. All algorithms based on this concept are assumed to be included in the scope of the invention.

Specifically, the candidate matching positions are found or not found in various forms from each block unit area as shown in FIG. 5. Unless the mass of the candidate matching positions over the entire band-shaped inspection area is judged as a whole, therefore, the accurate matching position (drn($\Delta$xr,$\Delta$yr)) cannot be determined for each block unit area.

Figure 6:
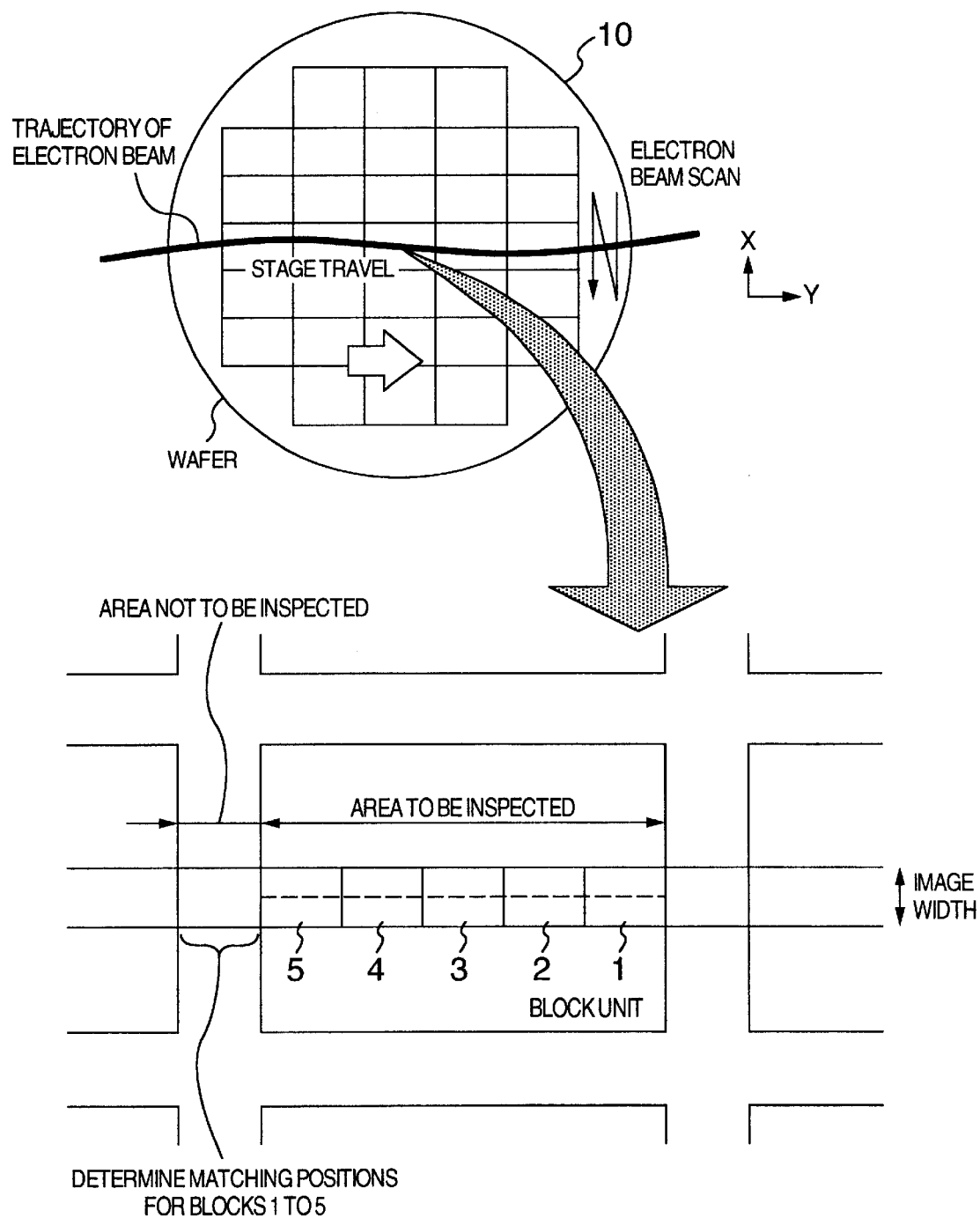
FIG. 6 is a diagram for schematically explaining the segmentation of the band-shaped inspection area into five block unit areas according to the invention.

The accurate matching position (drn($\Delta$xr,$\Delta$yr)) calculated in the CPU 46 for each block unit area is determined at the time when all candidates for one chip are determined, by reason of the fact that as shown in FIG. 6, a non-inspection area requiring no pattern inspection normally exists between the chips, and therefore a long calculation time is made conveniently available by determining the accurate matching position in the displacement detection unit 40 while the stage 2 is crossing the non-inspection area.

The accurate matching position is determined at the time when the candidate matching positions for one chip are determined in the band-shaped inspection area, and therefore the position matching and image comparison in the image comparator unit 60 is delayed by one chip. As a result, it is necessary to delay the detection image data f0(x,y) and the reference image data g0(x,y) in the delay memories 47, 48.

In the image comparator unit 60, the detection image data f1(x,y) and the reference image data g1(x,y) delayed by one chip are matched in position using the accurate matching position (accurate displacement amount) determined in the displacement detection unit 40, and by comparing the two image data, a coincidence failure exceeding a predetermined standard is determined as a candidate defect, thereby producing the position information for the candidate defect and the image data on the coincidence failure (as described specifically later). This determination of a candidate defect stems from the fact that false information is generated by the image distortion or the like between the detection image data and the reference image data.

In the defect editing unit 61, the merging process is performed for collecting a plurality of coincidence failure in the neighborhood of the point determined as a candidate defect based on the position information for the candidate defect and the image data indicating the coincidence failure obtained from the image comparator unit 60. For each collection of the coincidence failure thus obtained, the feature quantities such as the gravity center coordinate, X-Y projection length and the area are calculated and the false information is deleted from the feature quantities thus calculated, thereby outputting the position coordinates of the defects on the detection image data f1(x,y) and the feature quantities thereof.

In the overall control unit 20, the position coordinate on the detection image data f1(x,y) calculated in the defect editing unit 61 is converted into the coordinate system on the object inspection substrate 10 such as a semiconductor wafer thereby to finally determine the defect data including the position coordinate on the object substrate 10 and the feature quantities calculated from the defect editing unit 61.

The patterns repetitively formed on the chip on the object substrate 10 such as a semiconductor wafer intended for defect inspection have recently come to contain various shapes in coexistence. This is due to the fact that memories and logics have come to coexist with each other as in the system LSI and the pattern has become more and more fine.

As a result, in the detection image signal and the reference image signal in the block unit area obtained by segmentation of the band-shaped inspection area, the chance is created that a signal pattern having a small pattern 11 as shown in FIG. 3A is cut out, a signal pattern having a small irregular pattern 12 different in direction exists in a unidirectional pattern is cut out as shown in FIG. 3B, or a signal pattern having a slightly irregular pattern 13 included in the repetitive pattern as shown in FIG. 3C is cut out. These irregularities can occur regardless of whether the image size ($M_X \times M_Y$) of the block unit obtained by segmentation is large or small.

According to this embodiment, in contrast, the matching position is determined by the CPU 46 in such a manner that the candidate matching positions for a plurality of block unit areas over the entire band-shaped inspection area are not conflicting even in the case where the detection image signal and the reference image signal are cut out for each block unit area and the matching position is not detected or a plurality of matching positions are detected for each block unit area as shown in FIG. 5 based on the correlation value matrix calculated in the calculation unit 45, for example. Therefore, the accurate matching position is selected more positively, thereby making it possible to remarkably reduce the number of block unit areas generating false information due to the position matching error. Especially, even in the case where the S/N ratio or the pattern contrast is low or the brightness irregularities occur in the detection image signal and the reference image signal for a given block unit area, an accurate matching position can be selected more positively, thereby making it possible to remarkably reduce the number of the block unit areas generating false information due to the position matching error. At the same time, an accurate defect position is determined.

As described above, this embodiment is effective especially for a semiconductor logic product or the like in which the block contains a variety of patterns.

In the detection image signal and the reference image signal for each block unit area segmented, assume that the patterns are cut out as shown in FIGS. 2A, 2B and 2C. Even in the case where the calculation of the matching position in the calculation unit 45 and the CPU 46 develops a shift, the difference (coincidence failure) is not caused between the two detection signal and the reference signal and no false information is generated.

It was described above that the process for determining the matching position is performed in the displacement detection unit 40 while the stage is crossing the area requiring no inspection between chips. For this process to be performed, it is necessary for the user to determine, before inspection by use of the input means 25, a particular area as an inspection area in the object substrate (object to be inspected) 10 or the area for displacement detection while displaying the CAD information of the object substrate or the electron beam image of the typical object substrate actually detected on the display means 24.

According to this embodiment, a characteristic pattern is desirably included in the image as far as possible for realizing more accurate displacement detection. For this purpose, the test pattern area not normally used for inspection can also be included in the area for displacement detection.

(Supplement to Embodiment 1: Method of Calculating Candidate Matching Positions)

Figures 7A, 7B:
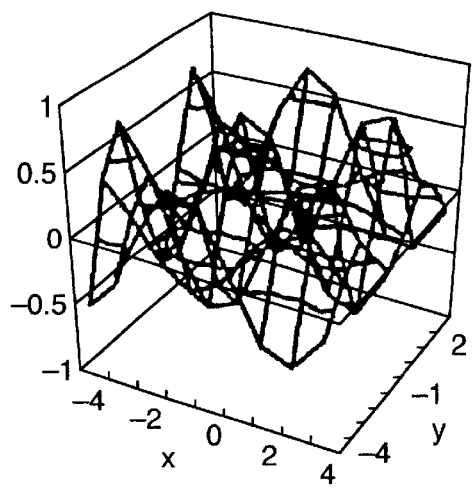
FIGS. 7A and 7B are diagrams showing an example of the correlation value matrix and the three-dimensional display thereof in the case where a detection image signal having a comparatively two-dimensionally repetitive pattern in a given block unit area according to the invention.

As described above, according to the first embodiment, the CPU 46 calculates the candidate matching positions between the detection image and the reference image based on the correlation value matrix calculated in the calculation unit 45. FIG. 7A shows an example of the correlation value matrix composed of 9×9 elements including ±4 pixels in both X and Y directions as the range of search for the candidate matching positions of the pattern repeated by about 4 pixels in X direction and about two pixels in Y direction in the block unit area as shown in FIGS. 2C and 3C.

FIG. 7B shows the existence of local maximum values three-dimensionally to facilitate the understanding. The normalized correlation value, which exists in the range of ±1, assumes the value of 1 once the detection image and the reference image coincide completely with each other and the value of −1 when the two images are not coincident with each other (the pattern phases of the two images are reversed). In the absence of a pattern on the image, on the other hand, the ups and downs of the correlation value are eliminated, and the correlation value is about 0. For this reason, a threshold is set (say, at 0.5), so that in the absence of elements exceeding the threshold, it is determined that there is no candidate matching position, while in the presence of local maximum values not less than the threshold, the positions of the local maximum values (x coordinate and y coordinate) as many as the local maximum values are stored as candidates. FIG. 7B shows seven candidates assuming a local maximum value.

Figures 8A, 8B:
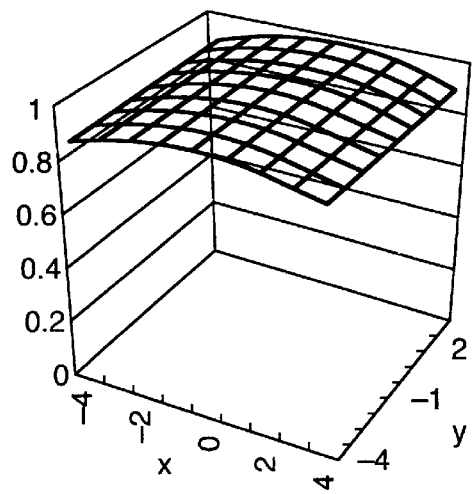
FIGS. 8A and 8B are diagrams showing an example of the correlation value matrix and the three-dimensional display thereof in the case where a detection image signal having a pattern directed along the Y axis and substantially free of change along the X axis in a given block unit area according to the invention.

Depending on the pattern included in the block unit area (a pattern similar to the pattern shown in FIGS. 2B and 3B uniform along Y direction and smoothly changing as a variable density value along X direction), on the other hand, the local maximum values may assume the shape of a roof as shown in FIG. 8. In such a case, the orientation of the roof and positions of the component elements are stored in a memory.

Figure 9:
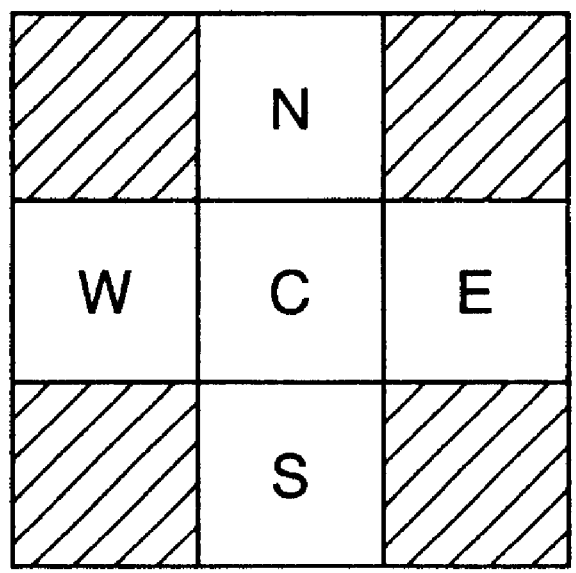
FIG. 9 is a diagram for explaining a method of calculating by interpolation the displacement amount not more than one pixel unit according to an embodiment of the invention.

The positions of the local maximum values exist only in units of pixels. In the case where candidate positions are required to be determined with an accuracy not larger than the pixel, therefore, some interpolation is required in the CPU 46. As shown in FIG. 9, for example, a parabolic surface is applied to the correlation values (N, S, E, W) at the positions of the four pixels at and in the neighborhood of the local maximum value (C), and by determining the position ($\delta x$, $\delta y$) corresponding to the top of the parabolic surface, which is added to the positions X, Y of the local maximum value. In this way, a candidate matching position can be determined with an accuracy of not larger than the pixel.

Also, not only the position of the crest or the roof but also the values (correlation values) or other feature quantities thereof can be stored to provide a selection standard for the process which determines the matching position from the candidates in the block.

According to this embodiment, the candidate matching positions are determined by calculating the correlation value (normalized cross-correlation) matrix in the calculation unit 45. Nevertheless, it is alternatively possible to determine the candidate matching positions indicating a local maximum value by calculating the square sum of the remainders $\Sigma\Sigma(f1(x,y)-g1(x,y))^2$ or the total sum of the absolute values of the remainders $|\Sigma\Sigma(f1(x,y)-g1(x,y))|$. Also, the candidate matching positions can be determined using the cross-correlation between differential images generated as a pre-process in the calculation unit 45. The differential image emphasizes the edge portion, and therefore this last method may reduce the error of the candidate matching position caused by the irregularities of the pattern brightness.

In the case where the candidate matching position indicating a local maximum value is determined by calculating the square sum of the remainders $\Sigma\Sigma(f1(x,y)-g1(x,y))^2$ or the total sum of the absolute values of the remainders $|\Sigma\Sigma(f1(x,y)-g1(x,y))|$, candidate matching positions can be determined with an accuracy of not more than the pixel by applying a parabolic surface to the square sum of the remainders or the total sum (N, S, E, W) of the absolute values of the remainders at the positions of the four pixels in the neighborhood of the local minimum value (C) including the local minimum value (C), determining the position ($\delta x$, $\delta y$) constituting the top of the parabolic surface and adding it to the position X, Y of the local minimum value.

(Supplement to Embodiment 1: Image Comparison Method 1)

As described above, according to the first embodiment, the image signals f1(x,y) and g1(x,y) are compared with each other in the image comparator unit 60.

Figure 10:
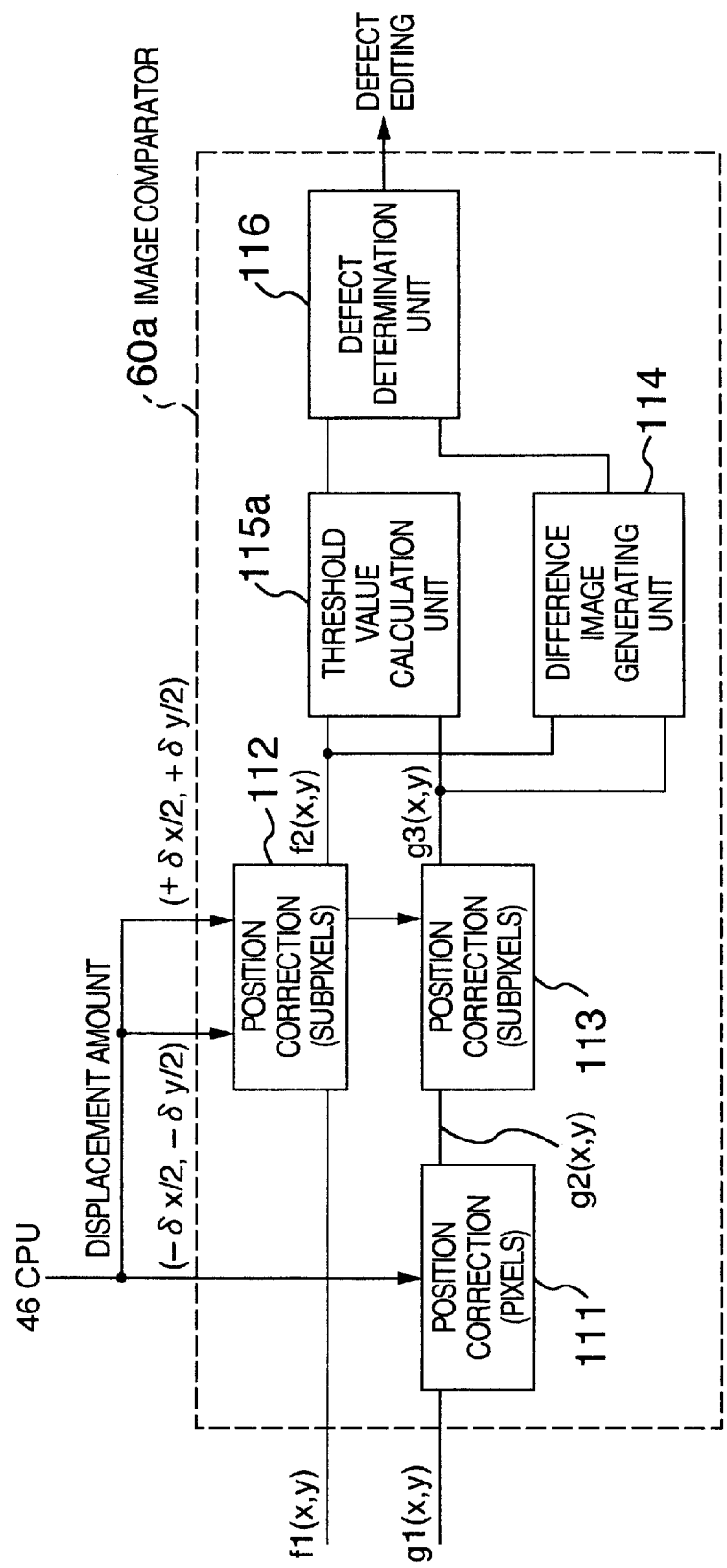
FIG. 10 is a block diagram showing a configuration of the image comparator unit according to a first embodiment of the invention.

This image comparator unit 60a according to a first embodiment will be specifically explained with reference to FIG. 10. First, in a position correcting unit 111, with regard to those position displacements (correct matching positions) calculated for each block unit area in the displacement detection unit 40 which represent integer multiples of the pixel, the reference image signal g1(x,y) is shifted by a corresponding amount thereby to set the position thereof with respect to the detection image signal f1(x,y). Specifically, the position correcting unit 111 shifts g1(x,y) by the unit pixel to g2(x,y).

For the remaining displacements less than the unit pixel, an image displaced by less than the unit pixel is generated for the purpose of calculation by interpolating the gradation values between pixels. Specifically, let the portion of the displacement amount in X direction less than the pixel be $\delta x$, and the portion of the displacement amount in Y direction less than the pixel be $\delta y$. Then, in the position correcting unit 113, the image signal f1(x,y) is shifted by $-\delta x/2$ in X direction and by $-\delta y/2$ in Y direction to make f2(x,y), while in the position correcting unit 113, the image signal g2(x,y) is shifted by $\delta x/2$ in X direction and by $\delta y/2$ in Y direction to make g3(x,y).

The geometric displacement correction for these image signals f1(x,y), f2(x,y) is called the geometric transformation. The interpolation methods used includes the linear interpolation, bi-linear interpolation and the cubic convolution interpolation. The two images are shifted by one half each in opposite directions without shifting one of the images alone in order to secure a substantially equal amount of the blur caused by the interpolation between the two images compared.

In a difference image generating unit 114, a difference image sub(x,y) between the candidate image (the detection image) f2(x,y) and the reference image g3(x,y) matched in position with an accuracy not more than the unit pixel with each other is generated. In a threshold value calculation unit 115a, on the other hand, the gradation value in the neighborhood of each coordinate (x,y) and the threshold value th(x,y) corresponding to the gradation value change rate in the neighborhood are calculated based on the detection image f2(x,y) and the reference image g3(x,y) matched in position with an accuracy not more than the unit pixel with each other.

In a defect determining unit 116, the difference image sub(x,y) and the threshold value th(x,y) are compared with each other, and in the case where the difference image sub(x,y) exceeds the threshold value th(x,y), a defect is determined, while if the difference image sub(x,y) is not more than the threshold value th(x,y), the absence of a defect is determined so that the position coordinate (x,y) of the defect in the detection image signal is output together with the difference image sub(x,y) or the detection image signal f2(x,y), for example.

(Supplement to Embodiment 1: Image Comparison Method 2)

Figure 11:
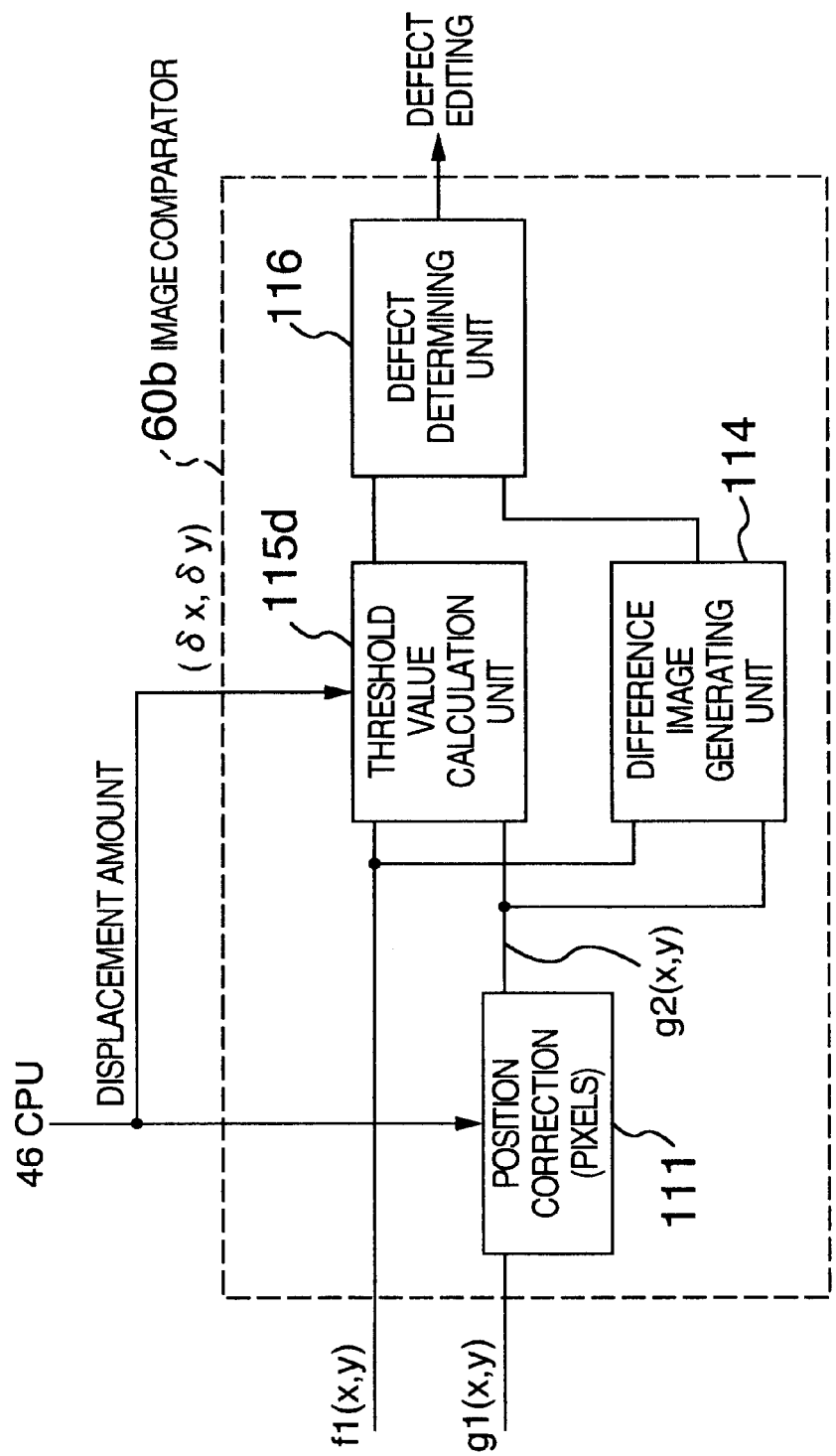
FIG. 11 is a block diagram showing a configuration of the image comparator unit according to a second embodiment of the invention.

An image comparator unit 60b according to a second embodiment will be specifically explained with reference to FIG. 11. The image comparator unit 60b according to the second embodiment is different from the image comparator unit according to the first embodiment (FIG. 10) in the manner of handling those displacement amounts calculated for each block unit area in the displacement detection unit 40 which involve the displacement (δx,δy) not more than the unit pixel. In the first embodiment, the difference image is generated after generating an image shifted by interpolation in the position correcting units 112, 113. In the second embodiment, on the other hand, the change amount of the difference image generated by shifting the position is estimated in the threshold calculation unit 115b and incorporated into the threshold value. The estimation is conducted in the following way, for example.

In the coordinate (x,y), let dfx(x,y) be the change rate in X direction and dfy(x,y) the change rate in Y direction of the gradation value of the image f1(x,y), and dgx(x,y) be the change rate in x direction and dgy(x,y) the change rate in Y direction of the gradation value of the image g2(x,y). Then, the change amount dsub(x,y) of the difference image is determined by the calculation in equation 1 shown below.

$$dsub(x, y) = \delta x \times (dfx(x,y) - dgx(x,y)) \delta y \times (dfx(x,y) - dgy(x,y)) \quad (1)$$

As in the first embodiment, the gradation value in the neighborhood of each coordinate (x,y) and the provisional threshold value th0(x,y) corresponding to the change rate of the gradation value in the same neighborhood are calculated, to which dsub(x,y) is added to obtain th1(x,y) as a threshold value of the difference image sub1(x,y) between f1(x,y) and g2(x,y). In the case where sub1(x,y) exceeds th1(x,y) in the defect determining unit 116, a defect is determined, while when sub1(x,y) is not more than th1(x,y), the absence of a defect is determined, so that the position coordinate (x,y) of the defect in the detection image signal is output together with the difference image sub(x,y) or the detection image signal f1(x,y), for example.

(Supplement to Embodiment 1: Image Comparison Method 3)

Figure 12:
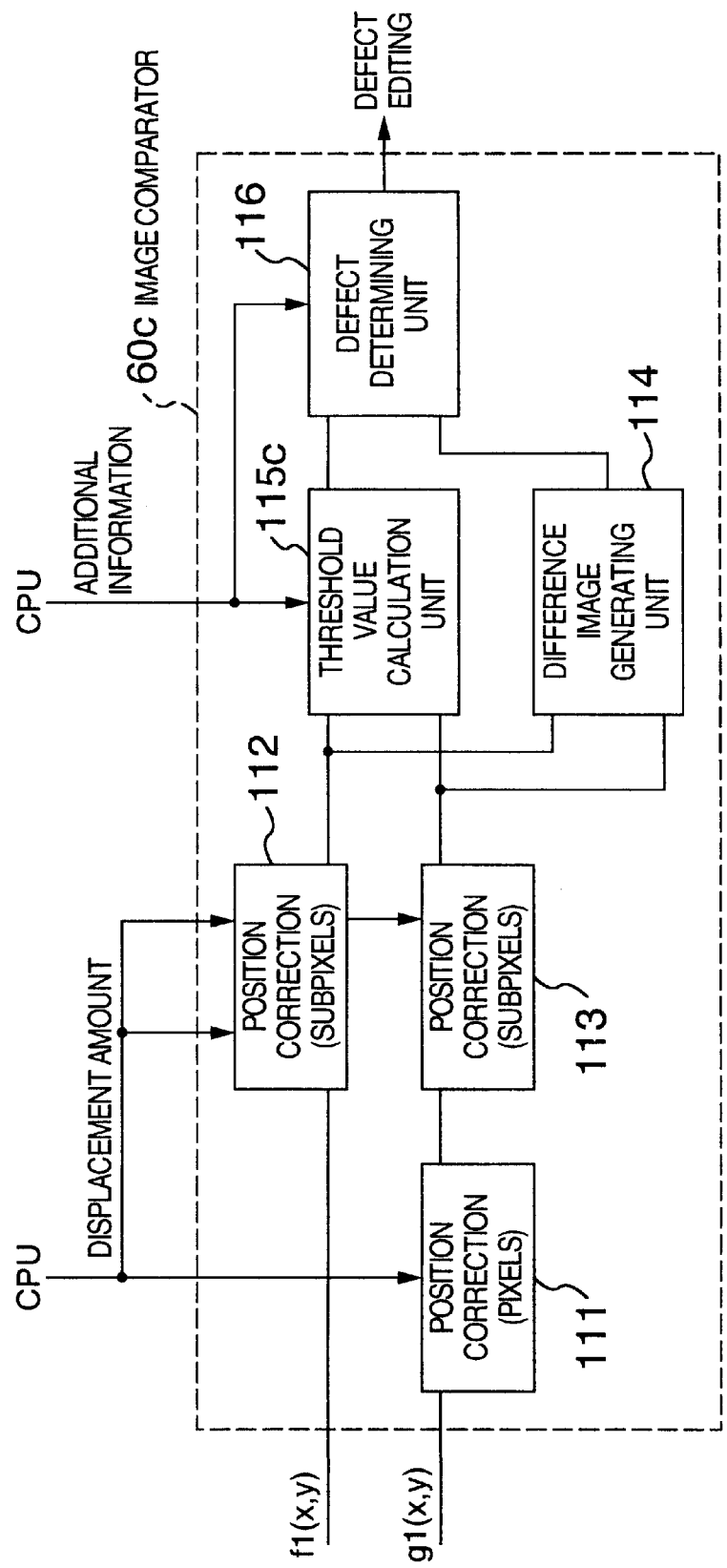
FIG. 12 is a block diagram showing a configuration of the image comparator unit according to a third embodiment of the invention.

An image comparator unit 60c according to a third embodiment will be specifically described with reference to FIG. 12. In the image comparator units 60a, 60b according to the first and second embodiments, the displacement amount for each block unit area resulting from the operation of the displacement detection unit 40 is used only for position matching at the time of image comparison. In the image comparator unit 60c according to the third embodiment, in contrast, as shown in FIG. 12, such additional information as the number of candidate matching positions for each block unit area or the index of the correctness of the matching positions determined are output from the displacement detection unit 40 in addition to the displacement amount and are input to the threshold value calculation unit 115c and the defect determining unit 116 to be used for image comparison.

The number of candidate matching positions and the period of the pattern included in the block are so related to each other that the smaller the pattern period, the greater the number of candidates. Therefore, for adjusting the inspection sensitivity in accordance with the pattern period (although a fine pattern poses the problem of fine defects making it desirable to improve the inspection sensitivity, it is often the case that only a large defect is considered a problem for a rough pattern), the threshold value for the difference image is adjusted by the threshold value calculation unit 115c in accordance with the number of candidates. The index of the correctness of the matching position, on the other hand, can be used for discrimination by determining that the inspection is carried out in the case where the index value is high while the inspection is not carried out in the case where the index value is low in the defect determining unit 116.

In any case, the user is required to be informed of a particular area of the object and the sensitivity with which the particular area is inspected and any area of the object excluded from the inspection. In the overall control unit 20, therefore, the control information on the areas to be inspected or not to be inspected and the inspection sensitivity for each area (block unit area) obtained from the threshold value calculation unit 114 of the image comparator unit 60 are required to be displayed on the monitor 24 and stored in the storage unit 26 in addition to the defect information including the feature quantities obtained from the defect editing unit 61.

By doing so, a defect classification unit can use these information for classifying the types of defect according to the cause of the defect, thereby making it possible to trace the cause of the defect.

Figure 13:
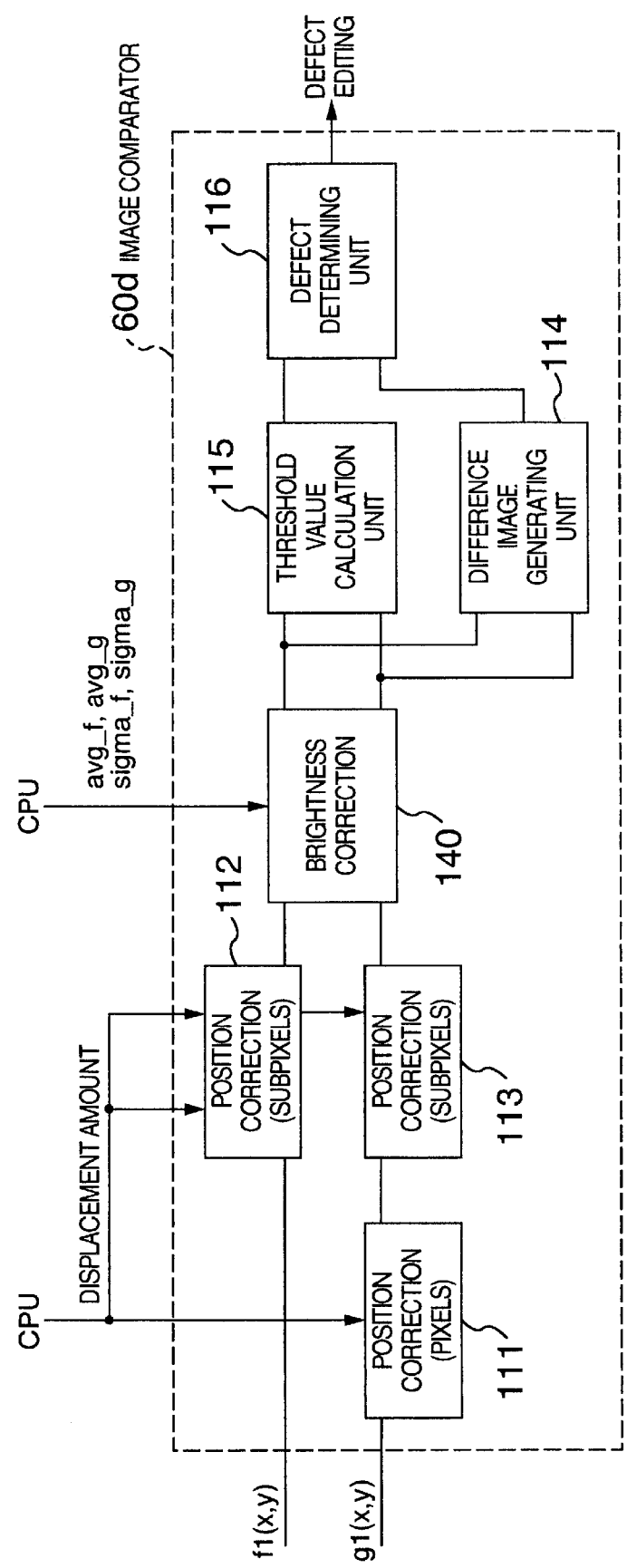
FIG. 13 is a block diagram showing a configuration of the image comparator unit according to a fourth embodiment of the invention.

Now, an image comparator unit 60d according to a fourth embodiment will be specifically explained with reference to FIG. 13. In the image comparator unit 60d according to the fourth embodiment, as shown in FIG. 13, the average values $f_{avg}$, $g_{avg}$ and the standard deviations $f_{sigma}$, $g_{sigma}$ of the detection image and the reference image obtained in the process of calculating the correlation value are output from the displacement detection unit 40, and the brightness is corrected according to equation 2 below in the brightness correction unit 140 prior to the generation of the difference signal.

$$fr = \{f(x,y) - f_{avg}\}/f_{sigma}$$

$$gr = \{g(x,y) - g_{avg}\}/g_{sigma} \quad (2)$$

where fo(x,y), go(x,y) are the gradation values of the two images before brightness correction, and fr(x,y), gr(x,y) are the gradation values of the two images after brightness correction.

Embodiment 2

Figure 14:
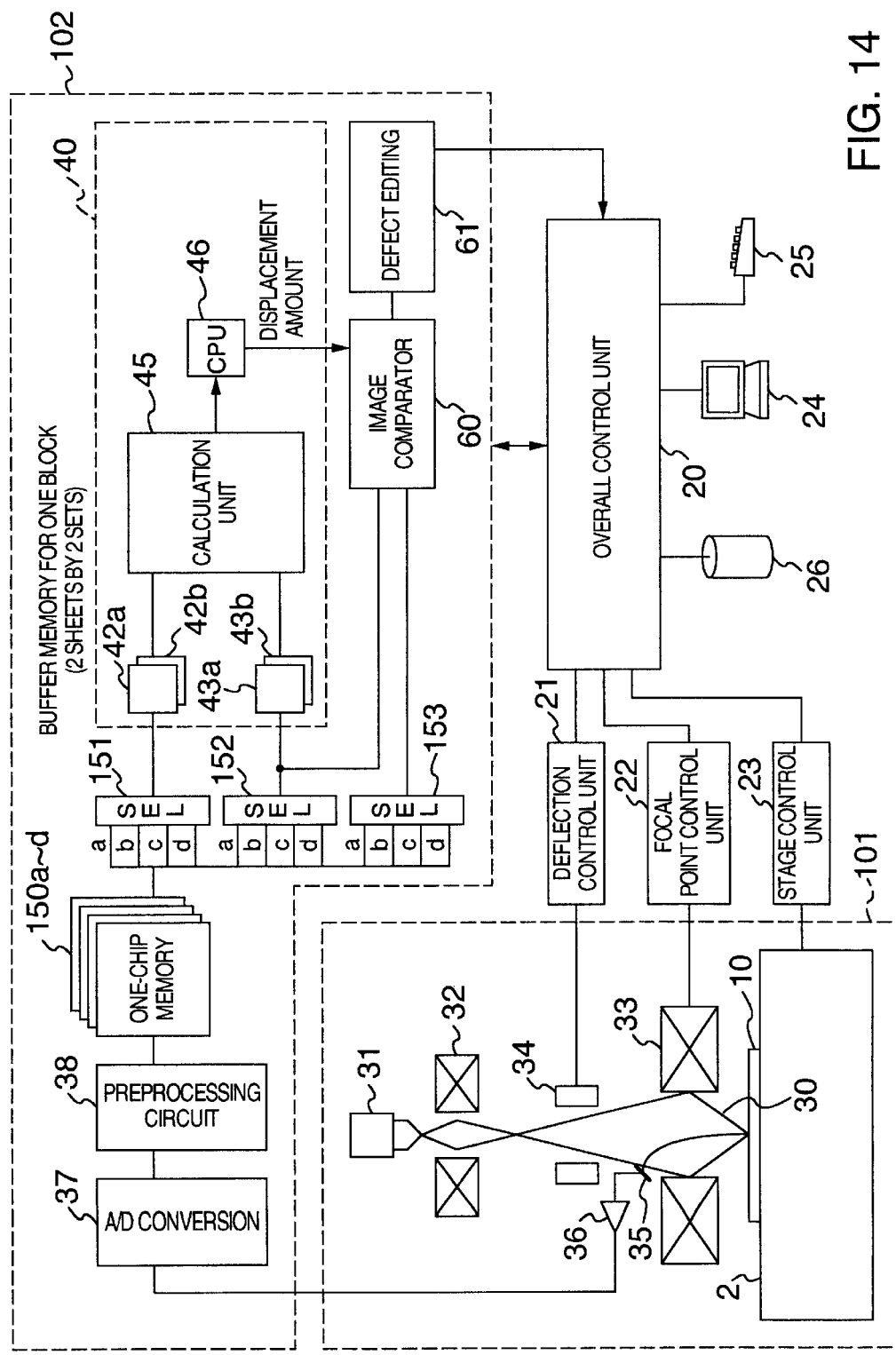
FIG. 14 is a diagram showing a general configuration of a pattern inspection apparatus using an electron beam according to the second embodiment of the invention.

FIG. 14 is a block diagram showing a configuration of a pattern inspection apparatus according to a second embodiment of the invention.

The second embodiment has exactly the same function as the first embodiment. Unlike in the first embodiment having three delay memories 39, 47, 48 each for one chip pitch, however, the second embodiment has four memories (150a, 150b, 150c, 150d) each capable of storing image data of one chip and used by being switched cyclically by selectors 151, 152, 153.

When the image signal from the detection unit 101 is stored in the memory 150d, for example, the image preceding by one chip is stored in the memory 150c, the image preceding by two chips in the memory 150b, and the image preceding by three chips in the memory 150a. While the image signal is being stored in the memory 150d, the displacement between the images of the memory 150c and the memory 150b is detected while at the same time comparing the images of the memory 150b and the memory 150a with each other.

The second embodiment has the advantage that the timings can managed more easily than in the first embodiment.

Embodiment 3

Figure 15:
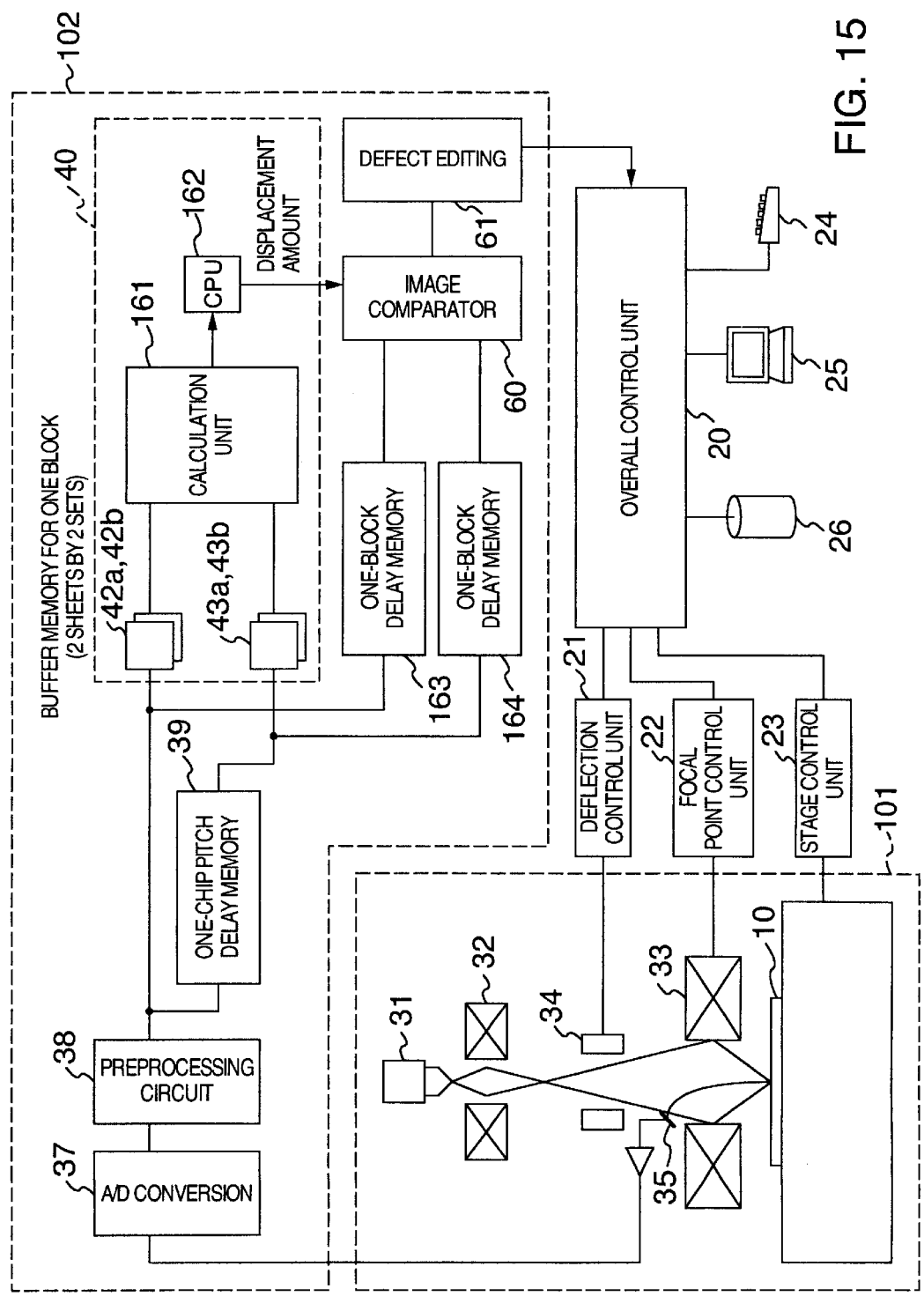
FIG. 15 is a diagram showing a general configuration of a pattern inspection apparatus using an electron beam according to the third embodiment of the invention.

FIG. 15 is a block diagram showing a configuration of a pattern inspection apparatus according to a third embodiment.

Unlike the first and second embodiments which are applicable to both the case in which there exists no matching position and the case in which a matching position cannot be determined as a plurality of matching positions are existent, the third embodiment is mainly applicable to the former case.

Specifically, the third embodiment is applicable mainly to the case in which an appropriate matching position is set for the block unit area which lacks a pattern or has only a small pattern as shown in FIGS. 2A and 3A or the case in which a pattern exists only in horizontal direction or only a small pattern exists in other than the horizontal direction, and therefore the matching position in X direction cannot be determined, or the matching position in Y direction cannot be determined for similar reason.

The third embodiment is also intended to reduce the error included in the candidate matching positions determined for each block unit area.

In the first and second embodiments, a matching position is determined after determining candidate matching positions for one chip. According to the third embodiment, in contrast, the correct matching position for the current block is estimated using the correct matching positions already determined.

Now, an explanation will be made with reference to the displacement in one direction for facilitating the understanding. Assume that n is the block number of the current block, the correct matching position for the immediately preceding block is determined as $dr(n-1)$, the correct matching position for the second preceding block is determined as $dr(n-2)$, and so on.

The operation up to the step in which the calculation unit 161 determines a correlation value matrix with an image of a predetermined size (block unit area) as a unit of processing is the same as the corresponding operation in the first embodiment. In the CPU 162, the position of the peak of the correlation value is determined as a matching position. In the case where the correlation value is less than a reference value, however, it is determined that the correct matching position cannot be determined, and as described later, the correct matching position for the current block is determined from the past correct matching positions.

These series of process (search for the matching position, determination as to the availability of the matching position, and the calculation of the correct matching position for the current block using the past correct matching positions) are performed within the time when an image of a block is input. Thus, the delay amount of the delay circuits 163, 164 is one block unit area, and images are compared one block behind.

In the case where the correct matching position is not determined for the current block, the CPU 162 determines the correct matching position by the following calculation, for example.

The correct matching position $dr(n)$ for the current block n is assumed to be the correct matching position $dr(n-1)$ for the preceding block (n−1 as indicated by equation 3 below.

$$dr(n)=dr(n-1) \qquad (3)$$

The average correct matching position for the past several blocks is used as the correct matching position $dr(n)$ for the current block n as shown in equation (4) below.

$$dr(n)=\{dr(n-1)+dr(n-2)+ \ldots +dr(n-m)\}/m \qquad (4)$$

The correct matching positions for the past several blocks are weighted and averaged out to determine the correct matching position $dr(n)$ for the current block n as shown in equation (5) below.

$$dr(n)=\{c1 \times dr(n-1)+c2 \times dr(n-2)+ \ldots +cm \times dr(n-m)\}/\{c1+c2+ \ldots +cm\} \qquad (5)$$

The correct matching position $dr(n)$ for the current block n is estimated from the behavior of change of the correct matching positions for the past several blocks. It is indicated by the relation of equation 6 below, for example.

$$dr(n)=dr(n-1)+\{dr(n-1)-dr(n-2)\} \qquad (6)$$

Also, even in the case where the correct matching position is determined for the current block, the correct matching position can be determined again by the following calculation for reducing an error.

The average of the matching position estimated to be correct for the current block and the correct matching positions for the past several blocks is used. Specifically, this relation is indicated by equation 7 below.

$$dr(n)=\{dr(n)+dr(n-1)+dr(n-2)+ \ldots +dr(n-m)\}/(m+1) \qquad (7)$$

The matching position estimated to be correct for the current block and the correct matching positions for the past several blocks are weighted and averaged out. Specifically, this relation is indicated by the following equation 8.

$$dr(n)=\{c0 \times dr(n)+c1 \times dr(n-1)+c2 \times dr(n-2)+ \ldots +cm \times dr(n-m)\}/\{c0+c1+c2+ \ldots +cm\} \qquad (8)$$

The third embodiment is not suitable for the situation in which the search range of the matching position exceeds the pattern pitch and the "pitch shift" described above is liable to occur (each "pitch shift" may occur differently). This embodiment, however, is expected to exhibit an effect to some extent for a system in which the matching position search range can be not more than the pattern pitch, i.e. a system in which the image displacement change is small.

The third embodiment is not applicable to a system having a large displacement, but has the advantage that the image processing unit can be reduced in size as compared with the first embodiment.

Embodiment 4

FIG. 16 is a block diagram showing a configuration of a pattern inspection apparatus according to a fourth embodiment of the invention. The fourth embodiment employs a method of improving the accuracy of matching in steps based on the concept of rough search.

This embodiment is the same as the first embodiment as far as the signal generated in a detection unit 101 is applied through an A/D converter 37 and a preprocessing unit 38 and produced as image signals f0(x,y), g0(x,y) corresponding to the same point on adjacent chips by a delay memory 39.

The detection image signal f0(x,y), after being applied through a low-pass filter 165, is thinned by a thinning circuit 167, and the detection image signal f3(x,y) after thinning is stored in memories 169a, 169b sequentially for each block unit area. At the same time, the reference image signal g0(x,y), after being applied through a low-pass filter 166 for preventing an aliasing error, is thinned (reduced) by a thinning circuit 168, and the reference image signal g3(x,y) after thinning is stored sequentially in memories 170a, 170b for each block unit area. The calculation unit 171 for calculating the normalized correlation or the like reads (cut outs) from he memories 169, 170 and inputs thereto the reference image signal g3(x,y) and the detection image signal f3(x,y) thinned for each segmented block unit area.

Figure 17A:
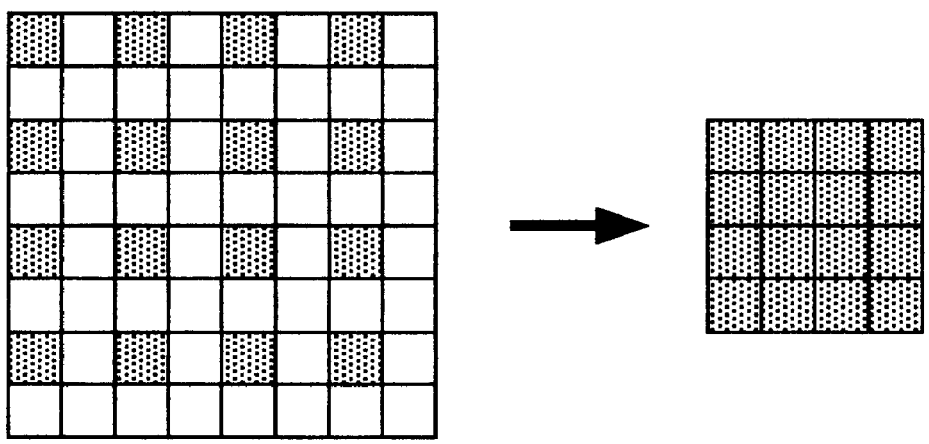
FIGS. 17A and 17B are diagrams for explaining the thinning process (reduction process) according to the invention.
Figure 17B:
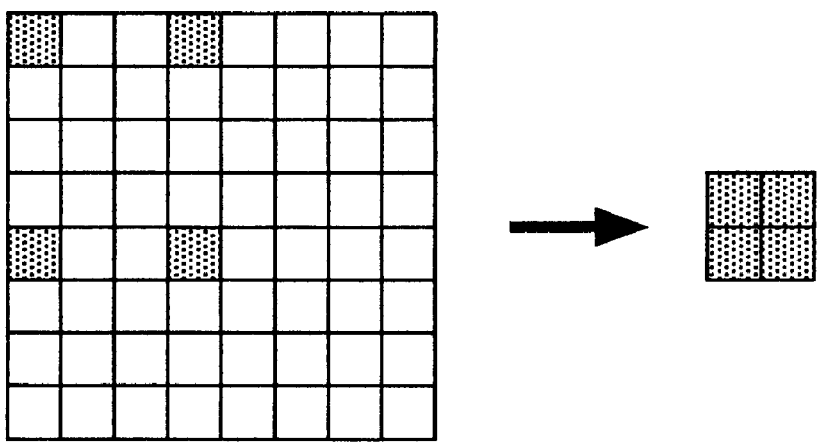

The thinning process (reduction process) in the thinning circuits 167, 168 is for picking up data at appropriate intervals from the original image. As shown in FIG. 17, the thinning process at intervals of two pixels reduces the image size to one fourth, and the thinning process (reduction process) at intervals of four pixels reduces the image size to one sixteenth.

The low-pass filters 165, 166 are indispensable for preventing the aliasing error due to the thinning process. For thinning at intervals of two pixels, for example, the pattern period of less than four pixels is required to be cut, and for the thinning process at intervals of four pixels, the pattern period of less than eight pixels is required to be cut. With the reduction in image size by thinning, however, the range of search for the matching position is also reduced in the calculation unit 171 for the normalized correlation or the like.

Assuming that the original image requires the search range of ±16 pixels, for example, the search range changes to ±8 pixels after thinning at intervals of two pixels and ±4 pixels after thinning at intervals of four pixels. Using the thinned image, the correlation values in the number corresponding to the search range are determined in the calculation unit 171 for the normalized correlation and the like, and the candidate matching positions are determined from the correlation value matrix in the CPU 172.

As in the first embodiment, the matching position is determined after obtaining candidate matching positions of one chip for each block. The matching position thus determined is between the thinned images. Therefore, an error of ±2 pixels in maximum occurs for thinning at intervals of two pixels, and an error of ±4 pixels in maximum occurs for thinning at intervals of four pixels.

In the calculation unit 45 and the CPU 46, the image signals f4(x,y), g4(x,y) not thinned but delayed by one chip through the delay circuits 173, 174 are read for each block unit area from the memories 42a, 42b and 43a, 43b. In this way, the candidate matching positions are calculated again and the matching position is determined for each block unit area. In the calculation unit 45 for normalized correlation or the like, however, the matching position previously determined by the thinned image is set at the center of the search range, thereby making it possible to search for candidate matching positions in a narrower search range.

Assume that the search range of ±16 pixels is required on the original image. If the signal is thinned at intervals of two pixels, for example, the search range for the calculation unit 45 is $\pm(2+\alpha)$ pixels, and if the signal is thinned at intervals of four pixels, the search range for the calculation unit 45 is $\pm(4+\alpha)$ pixels, where $\alpha$ is an allowance on the assumption that the aliasing error is not completely removed by the low-pass filter. The calculation unit 45 determines the correlation values in the number corresponding to the search range for each block unit area, and the CPU 46 determines the candidate matching positions from the correlation value matrix for each block unit area.

As in the first embodiment, the CPU 46 determines the matching position at least for each block unit area after obtaining the candidate matching positions of one chip for each block unit area. This constitutes the final displacement amount at least for each block unit area used when images are compared in the image comparator unit 60. The subsequent processing in the image comparator unit 60 is similar to those in the first embodiment.

In the case where the block size (though thinned) cut out of the memories 169a, 169b and the memories 170a, 170b is enlarged, an approximate displacement amount is determined by the calculation unit 171 and the CPU 172 for the block as a whole having a large image size. Even in the case where the block size (image size for block unit area) cut out of the memories 42a, 42b and memories 43a, 43b is reduced in size, therefore, the calculation unit 45 and the CPU 46 can calculate and determine a displacement amount for a smaller block unit area. As a matter of course, the detection image and the reference image can be compared in substantially matched position for each smaller block unit area (local area in a large block unit area) in the image comparator unit 60.

In short, an approximate displacement amount is determined by the calculation unit 171 and the CPU 172. Thus, the image size ($M_X \times M_Y$) with the cross-correlation thereof determined in the calculation unit 45 can be reduced below the image size ($M_X \times M_Y$) with the cross-correlation thereof determined in the calculation circuit 171. As a result, the detection image and the reference image substantially set in position to each other can be compared by the image comparator unit 60 for a local area (small block unit area) in a large block unit area, thus improving the defect inspection accuracy. In this case, since the image size of the block unit area is reduced, the number of the memories 42 and 43 can be increased to 4, 6 or 8.

According to the fourth embodiment, the matching position is determined in two stages, and therefore two sets of processing blocks are required. Especially, in the case where the image size ($M_X \times M_Y$) of the segmentation block unit area is increased in terms of the number of pixels to widen the search range, i.e. in the case where the displacement is large between the images compared, the size of the image processing unit can be rendered smaller than single stage. Assuming that the search range of +16 pixels is required, for example, the execution in a single stage requires the calculation of a total of 1089 $((16 \times 2 + 1)^2)$ correlation values in real time, resulting in a vast size of the image processing unit. The availability of two stages, on the other hand, makes it possible to set the search range of each stage to ±4 pixels, i.e. the number of the correlation values to be calculated can be reduced to 81.

As described above, the fourth embodiment is based on the concept of coarse and fine searching algorithm and has the advantage that the image processing unit can be reduced in size. Also, this embodiment is effectively applicable to a large image size ($M_x \times M_y$) in terms of the number of pixels of the segmentation block unit area.

Figure 18:
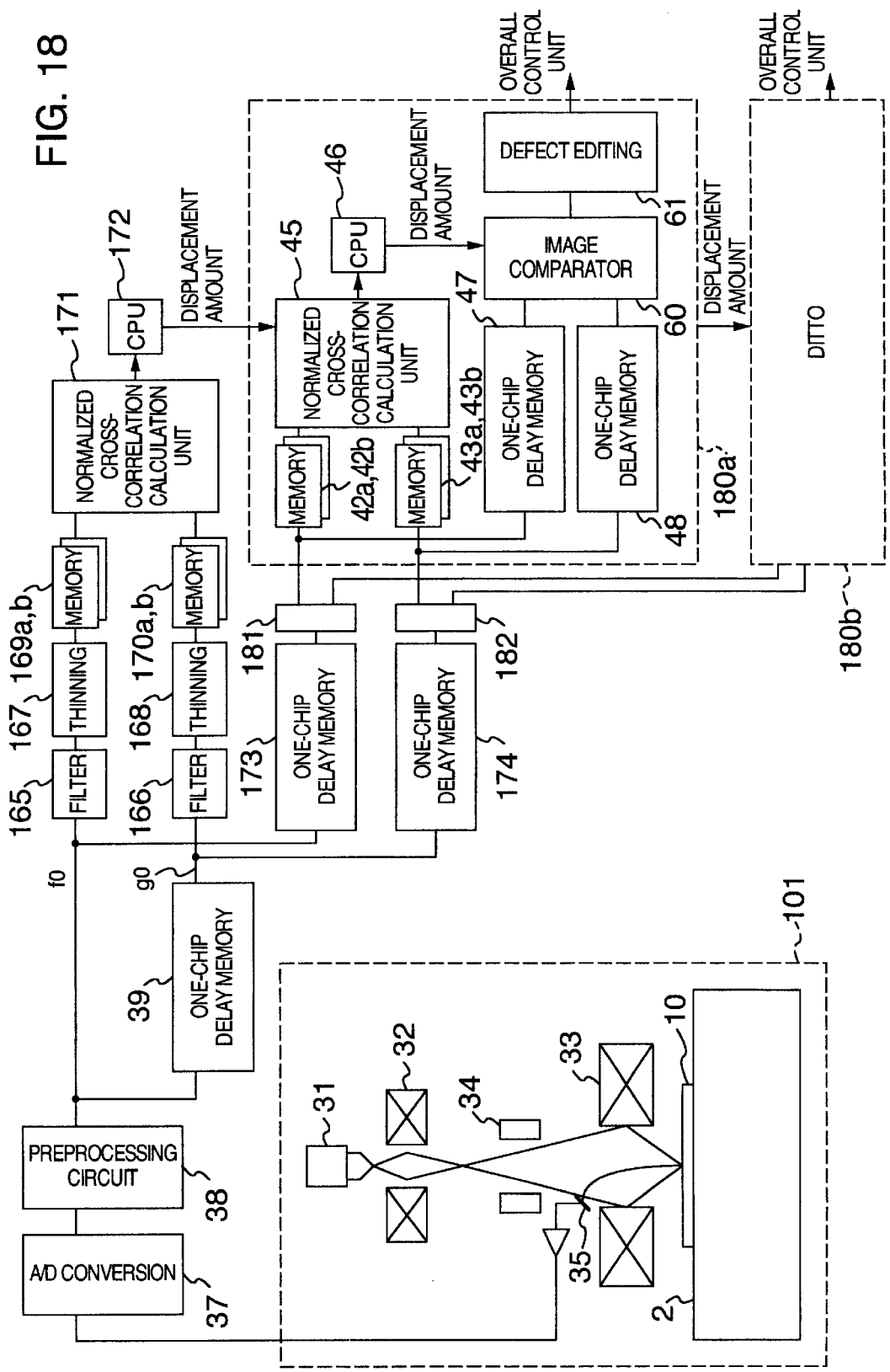
FIG. 18 is a diagram showing a general configuration of a pattern inspection apparatus using an electron beam according to the fifth embodiment of the invention.

FIG. 18 is a diagram showing a modification of the fourth embodiment. In this modification, after determining the matching position in the first stage, the detection image signal obtained from the delay memory 173 is segmented by a first selector 181 into two parts of an image size (indicated by dashed line as two parts (say, 500 pixels by 250 pixels) into which each of the block unit areas 1, 2, 3, 4 defined by solid line is segmented in a model diagram of FIG. 6) smaller than the image size (indicated as block unit areas (say, 500 pixels by 500 pixels) 1, 2, 3, 4, 5 defined as a model by solid line in FIG. 6) of the block unit areas segmented in the first stage.

One of the detection image signals thus segmented is input to a first image processing unit 180a and the other detection image signal segmented is input to a second image processing unit 180b. The reference image signal obtained from a delay memory 174 is segmented by a second selector 182 into two parts of an image size smaller than the image size for the block unit area segmented in the first stage.

One of the reference image signals thus segmented by the second selector 182 is input to the first image processing unit 180a, while the other segmented reference image signal is input the second image processing unit 180b. The first image processing unit 180a and the second image processing unit 180b perform the process for determining the matching position and image comparison in the second stage for each block unit area finely segmented.

The aforementioned modification concerns the case in which two image processing units 180 are juxtaposed. Nevertheless, four, six or eight instead of two image processing units may be included. By thus increasing the number of the image processing units 180, the matching position determination in the second stage is performed for each of the areas into which the block unit area for the matching position determination in the first stage is finely segmented.

The delay memories 47, 48, the image comparator unit 60 and the defect editing unit 61 can be shared by a plurality of displacement detection units in the first image processing unit 180a and the second image processing unit 180b for the first selector 181 and the second selector 182 by connecting the output of each of the delay memories 173, 174 to the delay memories 47, 48, respectively.

As described above, according to this modification, the determination of the matching position in the second stage is effected for each of the block unit areas (local areas) into which the block for the matching position determination in the first stage is segmented finely. Therefore, the modification is effective in the case where the distortion in the image is so large that the matching position varies from one place to another in the block of the size in the determination of the matching position in the first stage.

Specifically, in view of the intention to compare images in the image comparator unit 60 of each of the first and second image processing units 180a, 180b and detect a non-coincident portion as a defect, it is possible to secure such a block size (second stage) that the matching position is substantially equal in the particular block, i.e. the image distortion caused by the running stage can be ignored.

Also, the fourth embodiment is effectively applicable to the case where the displacement between the images to be compared is large (requiring a wide search range) and the images are distorted.

Embodiment 5

Figure 19:
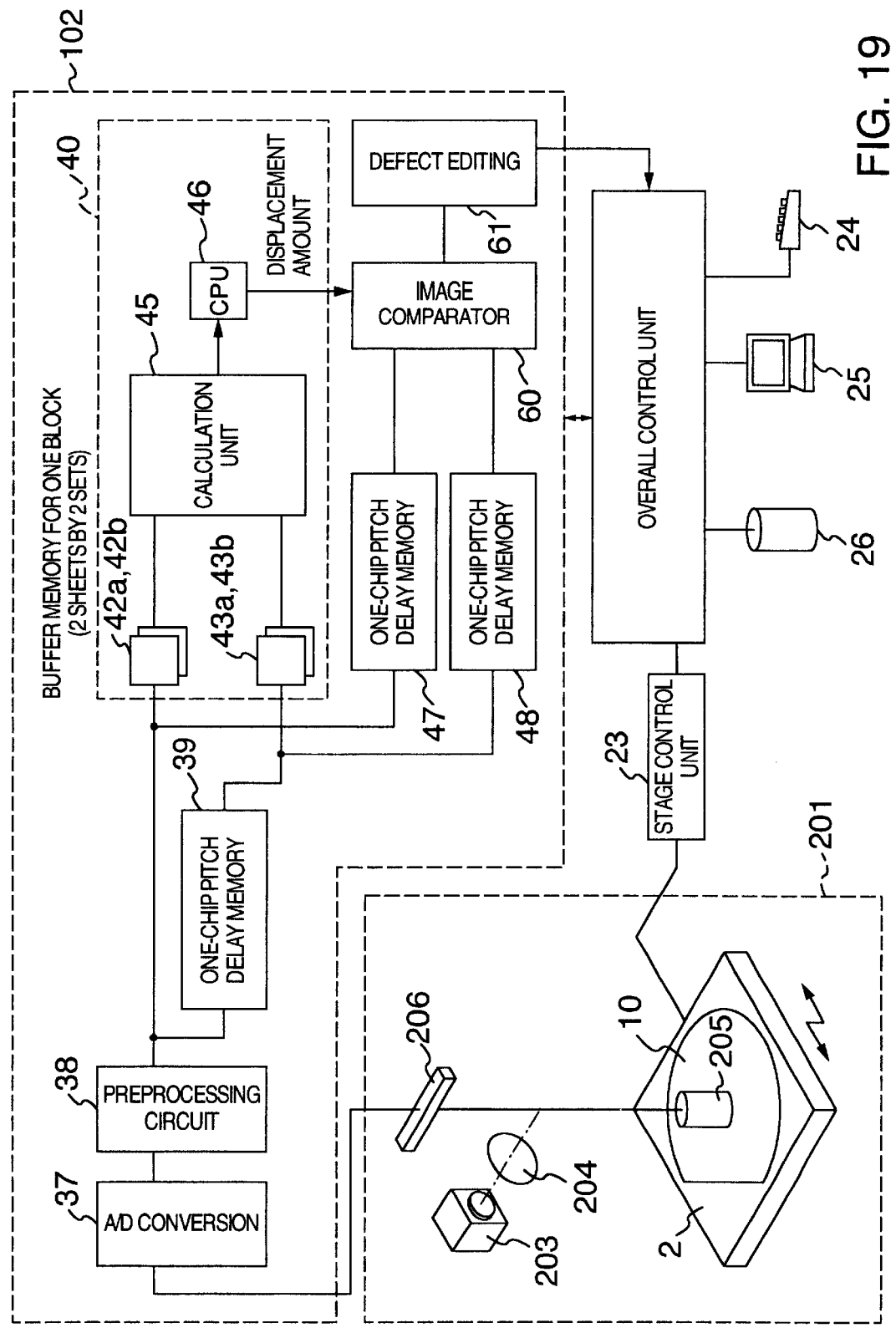
FIG. 19 is a diagram showing a general configuration of a pattern inspection apparatus using ultraviolet rays or the like according to the sixth embodiment of the invention.

FIG. 19 is a block diagram showing a configuration of a pattern inspection apparatus according to a fifth embodiment of the invention. The fifth embodiment is identical to the first embodiment except that the detection unit according to the fifth embodiment is configured with optical detection means 201. According to the fifth embodiment, therefore, the pattern inspection is carried out by use of an optical image detected from the object substrate 100 such as a semiconductor wafer.

The detection unit 201 includes a stage 2 with an object 100 such as a semiconductor wafer placed thereon and adapted to move in X and Y directions, a light source 203, an illumination optical system 204 for focusing the light emitted from the light source, an objective lens 205 for illuminating the object with the light focused by the illumination optical system thereby to form an optical image reflected from the object, and a one-dimensional image sensor 206 making up a photoelectric conversion element for receiving the optical image formed by the detection optical system including the objective lens and converting it into an image signal corresponding to the brightness thereof. The image signal detected by the one-dimensional image sensor 206 of the detection unit 201 is input to the image processing unit 102. In the image processing unit 102, the input analog signal is converted into a digital signal by an A/D converter 37. The preprocessing circuit 38 performs the image correction such as shading correction, dark level correction and filtering. The subsequent image processing is similar to the corresponding processes shown in the aforementioned embodiments and will not be described.

In order to make it possible to use the optical image formed by a one-dimensional image sensor 206 for inspecting ultra fine defects containing foreign matter existing on an ultra fine pattern formed on the object, it is necessary that an optical image having as high a resolution as an electron beam image can be detected by the one-dimensional image sensor 206. For this purpose, the light source 203 is required to be configured with an excimer lamp or the like emitting an excimer light constituting a far ultraviolet ray, and the illumination optical system 204 is required to be capable of zonal illumination or pseudo-zonal illumination with the one-dimensional image sensor 204 which is desirably of storage type capable of receiving the far ultraviolet light.

(Embodiment 6: Application to Semiconductor Fabrication Process)

A pattern inspection method according to an embodiment of the invention applied to a method of semiconductor fabrication will be explained with reference to FIG. 20.

A method of fabricating a semiconductor comprises .the step for setting up a wafer and oxidizing the surface thereof (S21), the second step for producing active elements on a substrate such as of Si (S22), the third step for forming an insulating film thereby to form a through hole and the like (S23), the nth step for forming a wiring pattern to form a multilayer wiring (S24), the (n+1)th step for forming an insulating film thereby to form a through hole and the like (S25), the step (S26) for forming an electrode and a protective film on the surface, the tester step (S27) for conducting an operating test on each chip, and the step (S28) for forming each semiconductor chip by dicing.

The nth step for forming the wiring pattern (S24) includes the film forming step S241, the resist application step S242, the exposure step S243, the development step S244, the etching step S245 for forming a wiring pattern by etching, the resist removing step S246 and the cleaning step S247.

The step S248 for inspecting the resist pattern after development and the step S249 for inspecting the wiring pattern after removing the resist are performed using a pattern inspection apparatus described in the foregoing embodiments.

One of a predetermined number of semiconductor wafers in the process of fabrication by exposure and etching is checked by sampling one out of 20 wafers, for example. The area to be inspected varies with the defect rate or the importance degree of the process involved.

Thus, by conducting the pattern inspection according to the invention on the semiconductor wafer and checking the contents of various defects detected, the fault of the semiconductor fabrication process can be detected. In the case where a shorting or disconnection of the resist pattern is detected as the result of inspection in the photolithography (coating the resist and developing) process shown in FIG. 20, for example, the conditions for exposure such as the focal point and the exposure time are seen not to be optimum.

Also, it is possible to check from the defect distribution whether the defects are generated in all the chips (shots) and thus to check whether the mask reticle used for forming the pattern has a defect or not.

In the case where the inspection result shows that the exposure conditions are faulty, the focal point or the exposure amount is adjusted, and the aforementioned inspection is conducted again thereby to check the result of the trouble shooting. Similarly, in the case where it is determined that the mask reticle has a defect, the mask reticle is repaired or replaced, and the inspection is conducted again to check whether the defect has disappeared or not.

According to the sixth embodiment, a fault of the process can be detected by conducting the inspection at a predetermined sampling frequency, and therefore a great amount of defects can be prevented from occurring. Also, it is possible to check the effect of the trouble shooting measure taken against a process fault.

Six embodiments were described above. The contents described as a supplement to the first embodiment are applicable also to the second to six embodiments. Also, the application of the pattern inspection method and apparatus according to the invention are not confined to the semiconductor but of course applicable with equal effect to various objects including TFT, photomask, printed board and ceramic board of which a defect has thus far been detected by image comparison.

According to the invention, even in the case where fine patterns of various shapes are formed in the inspection area of the object to be inspected, a high-resolution detection digital image signal detected for each of the block unit areas into which the band-shaped inspection area is segmented can be matched in position with a reference digital image signal by determining the correct displacement regardless of the shape of the fine pattern. As a result, the chance of the false information being generated by a positioning error is reduced and in addition the position information of a fine detect can be inspected with high reliability without overlooking a fine defect based on the difference image between the aforementioned two digital image signals matched in position with an accuracy and high resolution not more than the pixel size.

Also, the present invention is applicable to the defect inspection based on the electron beam image.

Further, the present invention has no restraints for the shape of the fine pattern and therefore is applicable to a wide variety of objects to be inspected.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pattern inspection method comprising:
   converting an analog image signal continuously detected from a desired band-shaped inspection area on an object to be inspected, into a detection digital image signal by A/D conversion means;
   generating a reference digital image signal to be compared with the detection digital image signal;
   cutting out each of the detection digital image signal and the reference digital image signal sequentially for each of a plurality of block unit areas into which the band-shaped inspection area is segmented, based on each of the reference digital image signal and the detection digital image signal;
   determining candidate matching positions between the detection digital image signal and the reference digital image signal for each block unit area sequentially cut out during the cut-out process and calculating plural matching positions over the whole of the band-shaped inspection area;
   determining an accurate matching position between the detection digital image signal and the reference digital image signal for each block unit area based on a continuity of the block unit areas from the calculated plural matching positions over a whole of the band-shaped inspection area; and
   determining a defect based on image comparison by position matching between the detection digital image signal and the reference digital image signal at least for each block unit area, based on the determined accurate matching position for each block unit area.

2. A pattern inspection method according to claim 1, wherein the detection image signal is continuously detected from the desired band-shaped inspection area formed repetitively on a chip on the object.

3. A pattern inspection method according to claim 1, wherein the determining a defect operation includes extracting a candidate defect based on the image comparison by position matching between the detection digital image signal and the reference digital image signal and removing false information from the candidate defect extracted.

4. A pattern inspection method for inspecting a fine pattern contained in each of a multiplicity of chips formed on a substrate, comprising:
   picking up an image of the substrate being moved continuously, to obtain a detection image signal;
   producing a reference image signal from the detection image signal obtained by picking up an image of the substrate; determining a displacement amount between the images corresponding to the detection image signal of the substrate picked up while the substrate is being continuously moved and the reference image signal, for each of a plurality of segmented areas smaller than one of a multiplicity of chips formed on the substrate;

correcting the detection image signal and the reference image signal based on the displacement amount for each of the segmented areas smaller than one chip; and comparing the corrected detection image signal and the corrected reference image signal with each other thereby to detect a defect of the pattern formed on the substrate.

5. A pattern inspection method according to claim 4, comprising correcting the detection image signal obtained by picking up the image, which is performed between the picking up an image of the substrate operation and the producing the reference image signal from the detection image signal operation.

6. A pattern inspection method according to claim 5, wherein the correcting the detection image signal operation includes performing a the dark level correction and/or a shading correction.

7. A pattern inspection method according to claim 4, wherein the displacement amount between the detection image signal and the reference image signal for each of the segmented areas smaller than one chip, is determined using the displacement amount for a plurality of segmented areas each smaller than the one chip.

8. A pattern inspection method for inspecting a fine pattern contained in each of a multiplicity of chips formed on a substrate, comprising:

producing an image signal of the substrate by picking up an image of the substrate;

producing a reference signal from the image signal;

determining a displacement correction amount on images corresponding to the image of the substrate the reference signal for an area unit smaller than one of a multiplicity of chips formed on the substrate;

correcting displacement between the image signal and the reference signal based on the displacement correction amount;

comparing a corrected detection image signal and a corrected reference signal from the correcting operation with each other and extracting a candidate defect of the pattern formed on the substrate; and editing an extracted candidate defect from the comparing operation.

9. A pattern inspection method according to claim 8, wherein to edit the extracted candidate defect is to delete false information from the extracted candidate defect.

10. A pattern inspection method according to claim 8, wherein a sensitivity of extracting the extracted candidate defect of the pattern is changed in accordance with a position on the substrate, and information on the changed sensitivity of extracting the candidate defect of the pattern is stored as information corresponding to the edited candidate defect.

11. A pattern inspection method according to claim 8, wherein a sensitivity of extracting the extracted candidate defect of the pattern is changed in accordance with a position on substrate, and information corresponding to the sensitivity is displayed on a monitor screen.

12. A pattern inspection apparatus comprising:

means for acquiring an image signal continuously from a desired band-shaped inspection area on an object to be inspected;

means for converting an analog image signal acquired in the means for acquiring an image signal, into a detection digital image signal by A/D conversion means;

means for generating a reference digital image signal to be compared with the detection digital image signal converted in the means for converting;

means for sequentially cutting out each of the detection digital image signal and the reference digital image signal for each one of a plurality of block unit areas into which the band-shaped inspection area is segmented, based on each of the detection digital image signal and the reference digital image signal generated in the means for generating;

means for calculating plural matching positions over a whole of the band-shaped inspection area by determining candidate matching positions between the detection digital image signal and the reference digital image signal sequentially cut out for each block unit area by the means for sequentially cutting out;

means for determining an accurate matching position between the detection digital image signal and the reference digital image signal for each block unit area based on continuity of the block unit areas from the plural matching positions over the whole of the band-shaped inspection area calculated by the means for calculating plural matching positions; and means for determining a defect based on image comparison by position matching between the detection digital image signal and the reference digital image signal, at least for each block unit area based on the accurate matching position for each block unit area determined by the means for determining an accurate matching position.

13. A pattern inspection apparatus according to claim 12, wherein the means for acquiring an image signal detects the image signal continuously from the desired band-shaped inspection area on chips formed repetitively on the object.

14. A pattern inspection apparatus according to claim 12, wherein the means for determining a defect includes means for extracting a candidate defect based on the image comparison by position matching between the detection digital image signal and the reference digital image signal, and means for deleting false information from the candidate defect extracted by the means for extracting a candidate defect.

15. A pattern inspection apparatus for inspecting a fine pattern contained in each of a multiplicity of chips formed on a substrate, comprising:

table means for removably holding a substrate thereon and being moveable in at least one direction;

means for picking up an image of the substrate placed on the table means and moved continuously, to obtain an image signal;

means for producing a reference image signal from the image signal obtained by picking up an image of the substrate in the means for picking up an image;

means for determining, for each of a plurality of areas smaller than one of a multiplicity of chips formed on the substrate, a displacement amount between the images corresponding to the image signal of the substrate continuously moved and picked up by the means for picking up an image and the reference image signal produced by the means for producing a reference image signal;

means for correcting the image signal and the reference image signal based on the displacement amount determined by the means for determining the displacement amount for each of a plurality of areas smaller than the one chip; and means for detecting a defect of the pattern formed on the substrate by comparing the image of the substrate and the reference image signal corrected by the means for correcting the image signal and the reference image signal based on the displacement amount.

16. A pattern inspection apparatus according to claim 15, comprising means for correcting the image signal obtained by the means for picking up an image of the substrate wherein a reference image signal is produced by the means for producing a reference image signal from the image of the substrate corrected by the means for correcting the image signal.

17. A pattern inspection apparatus according to claim 16, wherein the means for correcting the image signal corrects a dark level and/or shading of the image signal obtained by picking up an image of the substrate in the means for picking up an image of the substrate.

18. A pattern inspection apparatus according to claim 15, wherein the means for determining the displacement amount determines, using information on the displacement amount of a plurality of areas each smaller than the one chip, the displacement amount between the image signal and the reference image signal for each of the areas.

19. A pattern inspection apparatus for inspecting a fine pattern contained in each of a multiplicity of chips formed on a substrate, comprising:

means for acquiring an image signal of the substrate by picking up an image of the substrate;

means for generating a reference image from the image signal acquired by the means for acquiring an image signal;

means for determining, for each area smaller than one of a multiplicity of chips formed on the substrate, a displacement correction amount between an image signal of the substrate acquired by the means for acquiring an image signal of the substrate and a reference image generated by the means for generating a reference image;

means for correcting, for each area smaller than the one chip, displacement between the image signal of the substrate and the reference image based on the displacement correction amount determined by the means for determining a displacement correction amount;

means for comparing the image signal of the substrate and the reference image corrected by the means for correcting displacement, and extracting a candidate defect of the pattern formed on the substrate; and means for editing a candidate defect extracted by the means for comparing and extracting.

20. A pattern inspection apparatus according to claim 19, wherein the means for editing a candidate defect deletes false information from the candidate defect.

21. A pattern inspection apparatus according to claim 19, wherein the means for comparing and extracting changes a sensitivity of extracting the candidate defect of the pattern in accordance with a position on the substrate.

22. A pattern inspection apparatus according to claim 21, comprising storage means for storing the sensitivity of extracting the candidate defect by the means for comparing and extracting, as information corresponding to the candidate defect information edited by the means for editing a candidate defect.

23. A pattern inspection apparatus according to claim 21, comprising means for displaying information on the sensitivity of extracting the candidate defect of the pattern on a display screen.

* * * * *